(12) United States Patent
Swiniarski et al.

(10) Patent No.: US 11,840,190 B1
(45) Date of Patent: Dec. 12, 2023

(54) OCCUPANT PROTECTION SYSTEM FOR VEHICLE

(71) Applicant: Zoox, Inc., Foster City, CA (US)

(72) Inventors: Michal Jan Swiniarski, Brentwood (GB); Markus Jost, San Mateo, CA (US); Andrew Frank Raczkowski, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/733,379

(22) Filed: Apr. 29, 2022

(51) Int. Cl.
| | |
|---|---|
| *B60R 21/232* | (2011.01) |
| *B60R 21/233* | (2006.01) |
| *B60R 21/214* | (2011.01) |
| *B60R 21/231* | (2011.01) |

(52) U.S. Cl.
CPC .......... *B60R 21/232* (2013.01); *B60R 21/214* (2013.01); *B60R 21/233* (2013.01); *B60R 2021/23107* (2013.01)

(58) Field of Classification Search
CPC ........... B60R 2021/23107; B60R 2021/23153; B60R 2021/23161; B60R 2021/23192; B60R 21/213; B60R 21/214; B60R 21/232; B60R 21/233
See application file for complete search history.

(56) References Cited

U.S. PATENT DOCUMENTS

| | | | | |
|---|---|---|---|---|
| 6,152,481 A | * | 11/2000 | Webber | B60R 21/232 280/730.2 |
| 6,386,578 B1 | * | 5/2002 | Nanbu | B60R 21/232 280/730.2 |
| 6,508,487 B2 | * | 1/2003 | Koster | B60R 21/23184 280/730.2 |
| 6,851,706 B2 | * | 2/2005 | Roberts | B60R 21/232 280/730.1 |
| 7,195,276 B2 | * | 3/2007 | Higuchi | B60R 21/231 280/743.1 |
| 7,222,877 B2 | * | 5/2007 | Wipasuramonton | B60R 21/2338 280/730.2 |
| 7,350,804 B2 | * | 4/2008 | Bakhsh | B60R 21/232 280/730.2 |
| 7,618,057 B2 | * | 11/2009 | Pinsenschaum | B60R 21/2338 280/730.2 |
| 7,997,615 B2 | * | 8/2011 | Jang | B60R 21/2338 280/743.1 |
| 8,020,888 B2 | * | 9/2011 | Cheal | B60R 21/233 280/730.2 |
| 8,235,418 B2 | * | 8/2012 | Slaats | B60R 21/232 280/730.2 |
| 8,414,017 B2 | * | 4/2013 | Lee | B60R 21/231 280/743.1 |

(Continued)

FOREIGN PATENT DOCUMENTS

WO    WO-2012144748 A2 * 10/2012 ........... B60R 21/232

*Primary Examiner* — Laura Freedman
(74) *Attorney, Agent, or Firm* — Lee & Hayes, P.C.

(57) ABSTRACT

A vehicle includes an expandable curtain disposed in a roof of the vehicle and is configured to selectively deploy from a stowed configuration to a deployed configuration. An expandable bladder is configured to inflate at least partially during deployment of the expandable curtain. The expandable bladder includes a neck portion mechanically coupled to the expandable curtain and a head portion extending from the neck portion.

20 Claims, 14 Drawing Sheets

(56) References Cited

U.S. PATENT DOCUMENTS

| | | | | |
|---|---|---|---|---|
| 8,579,321 | B2* | 11/2013 | Lee | B60R 21/233 |
| | | | | 280/729 |
| 8,807,593 | B2* | 8/2014 | Lee | B60R 21/213 |
| | | | | 280/730.1 |
| 9,676,361 | B2* | 6/2017 | Smith | B60R 21/231 |
| 9,809,189 | B2* | 11/2017 | Grell | B60R 21/2334 |
| 10,118,582 | B2* | 11/2018 | Patel | B60R 21/239 |
| 10,471,923 | B2* | 11/2019 | Jimenez | B60R 21/232 |
| 10,703,320 | B2* | 7/2020 | Farooq | B60R 21/231 |
| 10,703,323 | B2* | 7/2020 | Jost | B60R 21/213 |
| 10,864,882 | B2* | 12/2020 | Obayashi | B60R 21/214 |
| 10,960,844 | B2* | 3/2021 | Jimenez | B60R 21/213 |
| 11,040,687 | B2* | 6/2021 | Jayakar | B60R 21/214 |
| 11,059,448 | B2* | 7/2021 | Rutelin | B60R 21/216 |
| 11,117,543 | B2* | 9/2021 | Jimenez | B60R 21/232 |
| 11,230,253 | B2* | 1/2022 | Hellot | B60R 21/239 |
| 11,267,431 | B2* | 3/2022 | Sekizuka | B60R 21/26 |
| 11,273,786 | B2* | 3/2022 | Ostling | B60R 21/231 |
| 11,498,508 | B2* | 11/2022 | Jayasuriya | B60R 21/23138 |
| 11,577,682 | B1* | 2/2023 | Bates | B60R 21/214 |
| 2005/0189743 | A1* | 9/2005 | Bakhsh | B60R 21/232 |
| | | | | 280/730.2 |
| 2006/0097491 | A1* | 5/2006 | Saberan | B60R 21/232 |
| | | | | 280/730.2 |
| 2020/0062210 | A1* | 2/2020 | Fukawatase | B60R 21/231 |
| 2022/0001828 | A1* | 1/2022 | Jimenez | B60R 21/232 |
| 2022/0111815 | A1* | 4/2022 | Schneider | B60R 21/2338 |

* cited by examiner

OCCUPANT PROTECTION SYSTEM FOR VEHICLE

BACKGROUND

Vehicles are often equipped with airbag(s) that protect occupant(s) of the vehicle in the event of a collision. For example, in response to the collision, the airbag(s) may be rapidly inflated to create a cushion between the occupant, surfaces of the vehicle, and/or object(s) inside the vehicle. As the difference between the speed of the occupant and the speed of the surface and/or the object(s) that the occupant contacts increases, the force by which the occupant is subjected also increases, thereby increasing the likelihood or severity of injury to the occupant during the collision. Conventional airbags attempt to reduce the effects of collisions by preventing or reducing the likelihood of the occupant contacting surfaces of the vehicle, object(s) inside the vehicle, and/or reducing the difference between the speed of the occupant and the speed of any surface the occupant contacts. However, conventional airbags may not provide sufficient protection to an occupant during certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
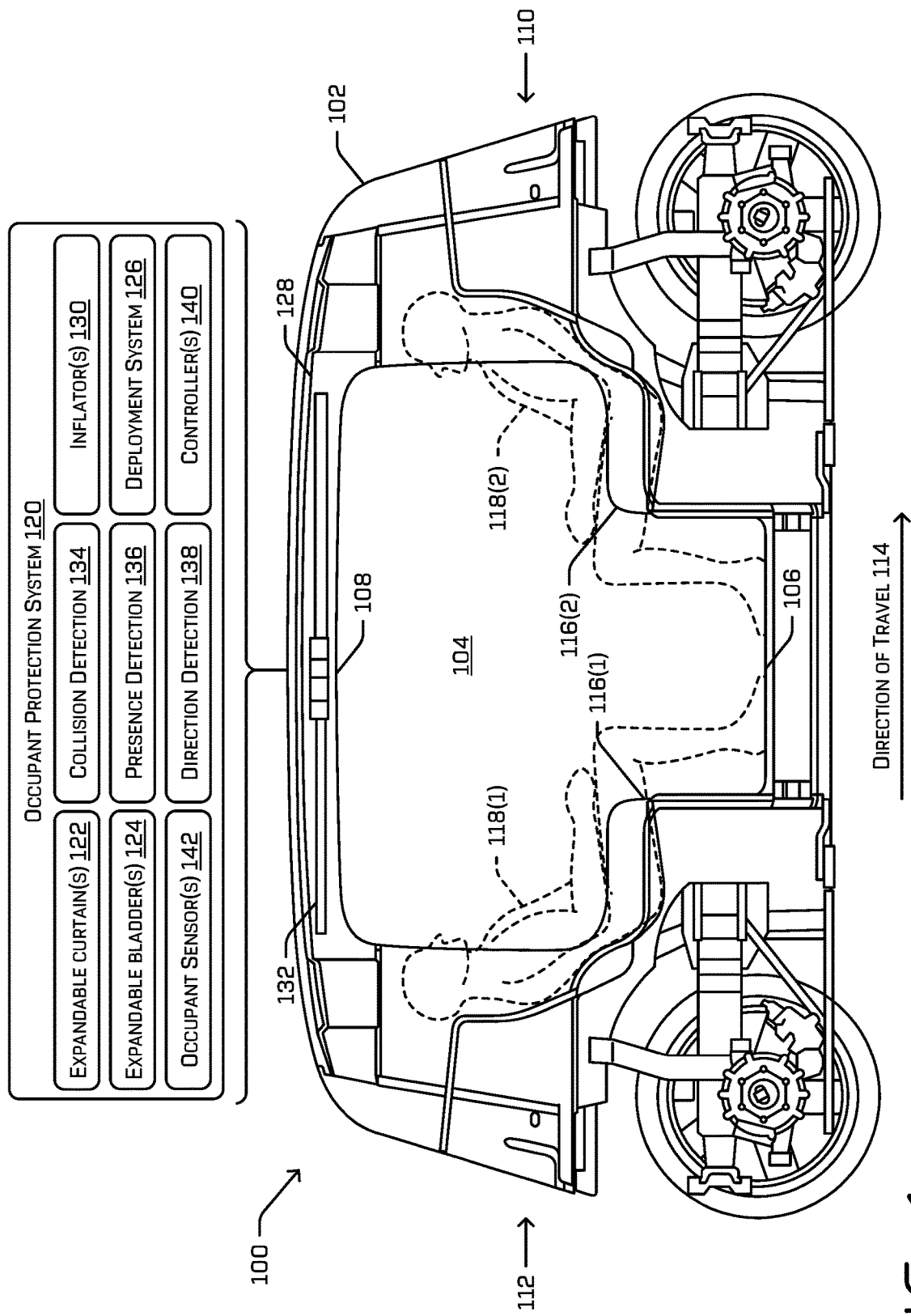
FIG. 1 illustrates a side view of an example vehicle including an example occupant protection system, according to an example of the present disclosure.

This application is directed, at least in part, to an occupant protection system that includes an expandable curtain and/or one or more expandable bladders configured to deploy to protect one or more occupants of a vehicle during a collision involving the vehicle. The occupant protection system can be configured to expand from a stowed state to a deployed state, during the collision, and can have a height that extends between a vehicle roof and a vehicle floor, as well as a length that extends between interior sides of the vehicle. In some instances, the expandable curtain may be configured to deploy and/or extend from a location adjacent to or in close proximity to the vehicle roof to a location above the vehicle floor. The one or more expandable bladders may be integrated with, and/or coupled to, the expandable curtain to control a movement of the occupant protection system in the event of a collision. In doing so, expandable bladders may be stabilized to limit forces or moments experienced by the occupants. In some instances, the occupant protection system may be used in vehicles having a carriage-style seating arrangement in which two or more seats face one another, for example, in the vicinity of a center of the interior of the vehicle.

In some instances, the expandable curtain may resemble a horseshoe-shaped or U-shaped design. In some instances, the expandable curtain may include a first side section, a second side section, and a front section. Although described as separate sections, the first side section, the second side section, and the front section of the expandable curtain may be contiguous and formed from a single piece of material. In this sense, the first side section, the second side section, and the front section may represent different portions, areas, or sections of the expandable curtain. Therefore, the expandable curtain may form a unitary barrier extending from one end of the expandable curtain to another end of the expandable barrier.

The expandable curtain may be located in the vehicle such that the front section of the expandable curtain, when deployed, may be located in front of one or more seats of the vehicle, and the one or more seats may be located between the first side section and the second side section of the expandable curtain. In some instances, the expandable bladder can be at least partially stowed in a portion of the vehicle associated with the vehicle roof and can be configured to expand from the stowed state to the deployed state. During deployment, the expandable curtain can extend into an interior of the vehicle (e.g., passenger compartment) where the seats support the occupants. In the deployed state, the first side section can be configured to extend along a portion of a first interior side of the vehicle, and the second side section can be configured to extend along a portion of a second interior side of the vehicle. In some instances, the first side section may be configured to extend substantially parallel to the first interior side of the vehicle, and/or the second side section of the expandable curtain may be configured to extend substantially parallel to the second interior side of the vehicle. The front section extends transversely between the first side section and the second side section of the expandable curtain, at a location in front of one or more seats.

The occupant protection system may include any number of expandable bladders that are configured to expand from a stowed state to a deployed state, or between a deflated and inflated state. The expandable bladders may represent chambers, compartments, or cavities that are pressurized in the event of a collision. The expandable bladders, in some instances, may be formed within and/or coupled, either directly or indirectly, to the expandable curtain. In some instances, expandable bladders may be located on or within the side sections and/or the front section of the expandable curtain. For example, a first expandable bladder may be located on the first side section of the expandable curtain, while a second expandable bladder may be located on the second side section of the expandable curtain. The first expandable bladder and the second expandable bladder may represent a first side airbag and a second side airbag, respectively, of the occupant protection system that are positioned adjacent to the interior sides of the vehicle.

Additionally, a third expandable bladder may be located on the side sections and/or the front section of the expandable curtain. In some instances, the third expandable bladder may include one or more horizontally-extending portions, one or more vertically-extending portions, and/or one or more diagonally-extending portions. When inflated, the one or more horizontally-extending portions extend at least partially from the first interior side to the second interior side of the vehicle. The one or more vertically-extending portions extend at least partially between the vehicle roof and the vehicle floor. In some instances, the one or more horizontally-extending portions and the one or more vertically-extending portions may be disposed on the front section. In some instances, the one or more diagonally-extending portions may be disposed on the first side section, the second side section, and/or the front section. In some instances, the one or more horizontally-extending portions, the one or more vertically-extending portions, and/or the one or more diagonally-extending portions may be inflated in unison, or at the same time. In this sense, the one or more horizontally-extending portions, the one or more vertically-extending portions, and/or the one or more diagonally-extending portions may represent portions of the third expandable bladder.

The first expandable bladder, the second expandable bladder, and the third expandable bladder may be integrated within the expandable curtain. For example, the first expandable bladder, the second expandable bladder, and the third expandable bladder may be formed within the expandable curtain and represent chambers of the expandable curtain that are inflated. In some instances, the expandable curtain may represent a single piece of woven material. At portions of the expandable curtain corresponding to the first expandable bladder, the second expandable bladder, and the third expandable bladder, the expandable curtain can be configured to be inflated. Portions of the expandable curtain at locations other than the first expandable bladder, the second expandable bladder, and the third expandable bladder may not be inflated. That is, portions of the expandable curtain at locations between the first expandable bladder, the second expandable bladder, and the third expandable bladder, may not be inflated. As such, the expandable curtain may be contiguous and form a continuous barrier extending from a first side of the expandable curtain to a second side of the expandable curtain.

The front section may include, or receive, a fourth expandable bladder and a fifth expandable bladder. In some instances, the fourth expandable bladder and the fifth expandable bladder represent frontal airbags of the occupant protection system. The occupant protection system may include the fourth expandable bladder and the fifth expandable bladder, one for a first occupant and a second occupant, respectively. In some instances, the fourth expandable bladder and the fifth expandable bladder include a neck portion that resides within a slit (e.g., channel, passage, etc.) formed within the front section, and a head portion that extends from the neck portion. The neck portion may be received at least partially within the slit that extends through the front section, while the head portion may reside external to the slit. The placement of the neck portion within the slit may serve to couple the fourth expandable bladder and the fifth expandable bladder to (or against) the front section. For example, the neck portion may secure the fourth expandable bladder and the fifth expandable bladder to the front section (or more generally, the expandable curtain) to prevent the fourth expandable bladder and the fifth expandable bladder shifting, moving, or reorienting in the event of a collision. This may center the fourth expandable bladder and the fifth expandable bladder in front of the occupant in the event of a collision as well as when as the occupants contacts the fourth expandable bladder and/or the fifth expandable bladder. The fourth expandable bladder and the fifth expandable bladder may be coupled to the vehicle independently of one another and/or independently of the expandable curtain. However, although discussed as being separate from the expandable curtain, in some instances, the fourth expandable bladder and the fifth expandable bladder may be coupled to, or directly integrated with, the expandable curtain.

The occupant protection system may include a deployment control system configured to cause the expandable curtain to expand from the stowed state to the deployed state. The expandable curtain may expand, at least in part, via inflating the expandable bladders. For example, the deployment control system may be configured to activate one or more inflators in flow communication with the first expandable bladder, the second expandable bladder, the third expandable bladder, the fourth expandable bladder, and the fifth expandable bladder. During this inflation, the first side section, the second side section, and the front section of the expandable curtain may rapidly expand from the vehicle roof. As such, upon involvement in a collision, the occupant protection system may be rapidly inflated to create a cushion between the occupant and interior surfaces of the vehicle.

In some instances, a first inflator can be in flow communication with the first expandable bladder, a second inflator can be in flow communication with the second expandable bladder, a third inflator can be in flow communication with the third expandable bladder, a fourth inflator can be in flow communication with the fourth expandable bladder, and a fifth inflator can be in flow communication with the fifth expandable bladder. As such, in some instances, the one or more inflators associated with expanding the expandable bladders of the expandable curtain (i.e., the first expandable bladder, the second expandable bladder, and the third expandable bladders) may be different than the one or more inflators associated with expanding the fourth expandable bladder and the fifth expandable bladder. However, in some examples, the one or more inflators associated with expanding the expandable bladders of the expandable curtain may be the same as the one or more inflators associated with expanding the fourth expandable bladder and the fifth expandable bladder.

In some instances, the deployment control system may be configured to cause the expandable curtain to deploy and/or expand from the stowed state to the deployed state at a first time, and thereafter cause the fourth expandable bladder and the fifth expandable bladder to expand from the stowed state to the deployed state at a second time following the first time. For example, once the expandable curtain can be deployed, the expandable curtain may provide a support structure against which the fourth expandable bladder and the fifth expandable bladder may abut to assist with arresting the movement of the occupant during the collision. This can be accomplished, for example, by deploying the expandable curtain prior to deployment of the fourth expandable bladder and the fifth expandable bladder to provide the support for the fourth expandable bladder and the fifth expandable bladder during a collision. In this instance, the occupant can contact the fourth expandable bladder or the fifth expandable bladder, and press the fourth expandable bladder or the fifth expandable bladder against the expandable curtain, which can provide support to the fourth expandable bladder and the fifth expandable bladder, to prevent the fourth expandable bladder and the fifth expandable bladder from deflecting. Thus, the first expandable bladder, the second expandable bladder, and the third expandable bladder may be deployed together, concurrently or substantially simultaneously, and thereafter, the fourth expandable bladder and the fifth expandable bladder may be deployed (e.g., 500 milliseconds, 10 milliseconds, etc. afterwards). The deployment of the expandable curtain can also position the fourth expandable bladder and the fifth expandable bladder during inflation. The deployment of the first expandable bladder, the second expandable bladder, the third expandable bladder, and the fourth expandable bladder and the fifth expandable bladder may at least partially overlap in time.

In some examples, the deployment control system may be configured to receive a signal indicative of a predicted collision involving the vehicle and/or a collision involving the vehicle, and cause deployment of the expandable curtain, the first expandable bladder, the second expandable bladder, the third expandable bladder, fourth expandable bladder, and/or the fifth expandable bladder based at least in part on the signal. For example, sensors associated with the vehicle may predict an imminent collision involving the vehicle or may detect a collision upon occurrence, and the deployment control system may receive one or more signals associated with the prediction and/or detection, and activate the occupant protection system.

The expandable curtain can couple to the vehicle to secure the expandable curtain during the collision. For example, a top of the expandable curtain may be coupled to a frame of the occupant protection system within the vehicle roof or ceiling of the vehicle. In some instances, the expandable curtain may be coupled to the frame at one or more locations along the first side section, the second side section, and the front section. The coupling can tether the expandable curtain to the vehicle such that, once deployed, the expandable curtain can be prevented from swinging in a direction away from the occupant during the collision. In doing so, the expandable curtain can extend along the side as well as in front of the occupant.

The vehicle may include more than one expandable curtain and respective expandable bladders. For example, if the vehicle includes a carriage-style seating arrangement including seats that face one another, the vehicle may include a second expandable curtain with respective expandable bladders. In this scenario, the front section of the expandable curtains, respectively, may extend between two seats that face one another and divide the interior of the vehicle.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 is a side cutaway view of a vehicle 100 according to aspects of the present disclosure. For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle 100 at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially- or fully-autonomously controlled.

As shown in FIG. 1, the vehicle 100 includes a body 102 defining an interior 104 of the vehicle 100. The interior 104 generally defines a passenger, cargo, or other compartment. As also illustrated, the interior 104 extends generally in a vertical direction from a vehicle floor 106 to a ceiling 108. The interior 104 also extends in a longitudinal direction, such as between a first end 110 of the vehicle 100 and a second end 112 of the vehicle 100. The interior 104 can also have a lateral dimension (e.g., normal to the viewing plane of FIG. 1) between opposite sides of the vehicle 100. In FIG. 1, the sides of the vehicle 100 have been removed for clarity. As will be appreciated, the body 102 and other aspects of the vehicle 100 are shown for example only.

The vehicle 100 may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, any combination thereof, and/or any other suitable power sources. Although the vehicle 100 has four wheels, the systems and methods described herein may be incorporated into vehicles having fewer or a greater number of wheels, tires, and/or tracks. In some instances, the vehicle 100 may have four-wheel steering and may operate generally with equal performance characteristics in all directions. Specifically, the vehicle 100 may be configured for bidirectional travel, such that when the vehicle 100 is travelling in a direction of travel 114 (from left to right in FIG. 1) the first end 110 of the vehicle 100 can be the leading end of the vehicle 100 and the second end 112 can be the trailing end of the vehicle 100, and when the vehicle 100 can be travelling in a direction opposite the direction of travel (from right to left in FIG. 1) the second end 112 can be the leading end of the vehicle 100 and the first end 110 becomes the trailing end of the vehicle 100. These example characteristics may facilitate greater maneuverability, for example, in small spaces or crowded environments, such as parking lots and urban areas.

A first seat 116(1) and a second seat 116(2) (collectively, "the seats 116") are disposed in the interior 104 of the vehicle 100. In the example of FIG. 1, a first occupant 118(1) can be seated in the first seat 116(1), and a second occupant 118(2) can be seated in the second seat 116(2). Collectively, the first occupant 118(1) and the second occupant 118(2) may be referred to herein as "the occupants 118," and one of the first occupant 118(1) or the second occupant 118(2) (or other occupant(s) not shown in FIG. 1) may be referred to generically as "the occupant 118."

The seats 116 include a seat portion on which the occupant 118 sits. The seat portion can be configured to support at least a portion of a weight of the occupant 118. The seat portion may include various contours, cushions, and/or other functional and/or aesthetic features. The seats also include a seatback portion. As in some conventional seats, a portion of a back of the occupant 118 may rest against or otherwise contact the seatback portion when the occupant 118 can be seated in the seat portion. The seats 116 also include a headrest, for supporting at least a back of a head of the occupant 118.

The seats 116 are arranged carriage-style such that the first occupant 118(1) and the second occupant 118(2) are facing each other. Accordingly, regardless of the direction of travel, one of the occupants 118 can face the direction of travel 114 and the other can have their back to the direction of travel 114. Although the example of FIG. 1 includes only the first seat 116(1) and the second seat 116(2), the first seat 116(1) may be one of a plurality of aligned first seats in a first row of seats, and/or the second seat 116(2) may be one of a plurality of aligned second seats in a second row of seats. Moreover, although the first seat 116(1) and the second seat 116(2) are illustrated as supporting a single occupant 118, in other examples, the seats 116 may be disposed as benches on which more than one occupant 118 may sit. Other relative arrangements and numbers of the seats 116 also are contemplated. Without limitation, all the seats 116 may be arranged to face in a same direction, more or fewer seats may be provided. For example, a third row of seats may be disposed in the interior 104.

With reference to FIG. 1, when the vehicle 100 travels in the direction of travel 114, the first occupant 118(1) can be forward-facing and the second occupant 118(2) can be rearward-facing. When travelling in the direction of travel 114, should the vehicle 100 come to an abrupt stop, such as a result of a rapid deceleration resulting from a collision or impact at the first end 110 of the vehicle 100, the occupants 118 can experience different forces associated with the deceleration differently. More specifically, a head of the second occupant 118(2) may be forced against the headrest portion of the second seat 116(2), and the back of the second occupant 118(2) may be forced against the seatback portion the second seat 116(2). In contrast, the inertia of the first occupant 118(1) can cause the first occupant 118(1) to continue to move in the direction of travel 114, which may tend to move the first occupant 118(1) relative to (and out of) the first seat 116(1). The seats 116 may also include a seat belt to prevent the occupants 118, such as the first occupant 118(1), from being ejected from the first seat 116(1).

The vehicle 100 may include an occupant protection system 120 configured to protect the occupant 118, such as the first occupant 118(1), during a collision involving the vehicle 100. As will be explained herein the occupant protection system 120 may include one or more expandable curtain(s) 122, one or more expandable bladders 124, and a deployment system 126 configured to control deployment of one or more of the expandable curtain(s) 122 and/or the one or more of the expandable bladders 124, so that they deploy from a stowed state, for example, as shown in FIG. 1, to a deployed state. The expandable curtain 122 and/or the expandable bladders 124 may be formed from, for example, a woven nylon fabric and/or other similar materials, or materials having suitable characteristics, and which can be storable within a vehicle roof 128 of the vehicle 100. The expandable curtain 122 and the expandable bladders may be concealed within the vehicle roof 128 via one or more covers, and which are breached during deployment. As such, the vehicle roof 128 can be configured to receive the expandable curtain(s) 122 and/or the expandable bladders 124, each in the stowed state (e.g., unexpanded state).

In some instances, the expandable curtain(s) 122 and/or expandable bladders 124 may be stored individually in separate housings. In some instances, such as where portions of the expandable curtain(s) 122 are separate, each portion may be stored individually. In some instances, upon receipt of one or more signals from the vehicle 100, the deployment system 126 may be configured to activate one or more inflators 130 in flow communication with the expandable curtain(s) 122 and/or the expandable bladders 124, such that the inflators 130 provide a fluid or gas to the expandable curtain(s) 122 and/or expandable bladders 124. In doing so, the expandable curtain(s) 122 and/or the expandable bladders 124 may rapidly expand from their stowed state (as shown in FIG. 1) to their respective deployed states (as shown and described herein).

The inflators 130 may include a gas generator, pyrotechnic charge, propellants, and/or any other suitable devices or systems. In some instances, the expandable curtain(s) 122 and/or expandable bladders 124 may be configured to deploy in, for example, less than 100 milliseconds or less than 50 milliseconds. As explained herein, the expandable curtain(s) 122 and/or the expandable bladders 124, in the deployed state, may protect the occupant 118 from injury, or reduce its likelihood or severity, during a collision involving the vehicle 100 by providing a cushion between the occupant 118 and interior structures of the vehicle 100. As will be explained herein, the expandable bladders 124 may be integrated, whether directly or indirectly, with the expandable curtain 122.

In some instances, the expandable curtain 122 and/or the expandable bladders 124 may extend from a framework 132 disposed in the vehicle roof 128. For example, when deployed, the expandable curtain 122 may drape, suspend, or otherwise hang from the framework 132. The framework 132 may also house or couple the inflators to the expandable curtain 122 and/or the expandable bladders 124. For example, the framework 132 may include conduits that channel propellants from the inflators 130 to the expandable curtain 122 and/or the expandable bladders 124. When deployed, the expandable curtain 122 and/or the expandable bladders 124 may reside in front of the occupant 118 and to the sides of the occupant 118.

In some instances, the vehicle 100 may be configured such that (all of) the expandable bladders 124 are configured to deploy or inflate in response to a collision. In other instances, however, and as discussed further below, the deployment system 126 may selectively inflate (fewer than all of) the expandable bladders 124 based on additional information about the vehicle 100. For example, the vehicle 100 may include one or more occupant sensors 142 that are configured to generate data associated with a presence/absence of the occupant 118 in the seat 116. Responsive to the occupant 118 being in the seat 116, the deployment system 126 may cause the expandable curtain 122 and the expandable bladders 124 to be deployed.

The occupant sensors 142 may be coupled to, or integrated into, the seatback portion of the seats 116. However, in other examples, the occupant sensors 142 may be coupled to, or incorporated into, the seat portion and/or any other portion of the seats 116. For example, and without limitation, the occupant sensors 142 may include pressure sensors, weight sensors, or other types of sensors that generate data for determining that some amount of mass is in the seat 116. In still further examples, the occupant sensors 142 may be embodied as other types of sensors, such as cameras, imaging sensors, or the like, that generate data used to determine presence of the occupant(s) 118.

The occupant protection system 120 is further shown including a collision detection component 134, a presence detection component 136, a direction detection component 138, and controller(s) 140. The collision detection component 134, the presence detection component 136, the direction detection component 138 and/or the controller(s) 140 may be embodied as one or more computing components configured to perform functionality associated with the occupant protection system 120. Although illustrated separately, some or all aspects of the occupant protection system 120 may be combined.

The collision detection component 134 may include functionality to determine that the vehicle 100 is involved in a collision. Alternatively, or additionally, the collision detection component 134 may include functionality to determine that a collision is imminent. Without limitation, the collision detection component can receive data about an acceleration (or deceleration) of the vehicle 100, about objects in the environment of the vehicle 100, from a prediction system configured to determine a likelihood of a collision with an object, and/or other types of data from other sources.

The presence detection component 136 may include functionality to determine the presence of objects in the vehicle 100. For example, the presence detection component 136 may receive data from the occupant sensors 142 and, based at least in part on that data, determine the seats 116 that are occupied by the occupants 118. In some instances, the presence detection component 136 may make a binary determination of whether a given seat has an occupant.

The direction detection component 138 includes functionality to determine a direction of travel of the vehicle 100. For example, the direction detection component 138 may determine that the vehicle 100 is travelling in the direction of travel 114. The direction detection component 138 may determine the direction of travel 114 based at least in part on any one of sensor data, heading data, route planning data, map data, and/or other data. The direction detection component 138 may additionally, or alternatively, determine a direction associated with each of the seats 116 and/or the occupants 118 of the seats 116. For instance, in the example of FIG. 1, the direction detection component 138 may determine that the first seat 116(1) is a rearward-facing seat and that the second seat 116(2) is a forward-facing seat.

The controller(s) 140 include functionality to inflate one or more of the expandable bladders 124 to cause the expandable bladders 124 to inflate configuration discussed above. In examples, the controller(s) 140 receive data from one or more of the collision detection component 134, the presence detection component 136, and/or the direction detection component 138. For example, the controller(s) 140 may cause inflation of one or more of the expandable bladders 124 based at least in part on information from the collision detection component 134 indicating that a collision event has occurred or is imminent. In another example, the controller(s) 140 may cause inflation of one or more of the expandable bladders 124 based at least in part on information from the presence detection component 136. For instance, the controller(s) 140 may deploy expandable bladders associated with seats that have occupants. If no occupant 118 is associated with a seat 116, the controller(s) 140 may not deploy the expandable bladder associated with that seat 116, even when a collision occurs. Still, in a further example, the controller(s) 140 may cause inflation of one or more of the expandable bladders 124 based at least in part on information from the direction detection component 138 indicating the direction of travel 114 and/or an orientation of the seats 116. For example, the controller(s) 140 may deploy expandable bladders associated with any occupied rear-facing seat. Of course, these are examples only, intended to demonstrate various functionality of the controller(s) 140. Other functionality is disclosed herein, and/or will be appreciated with the benefit of this disclosure.

Figure 2:
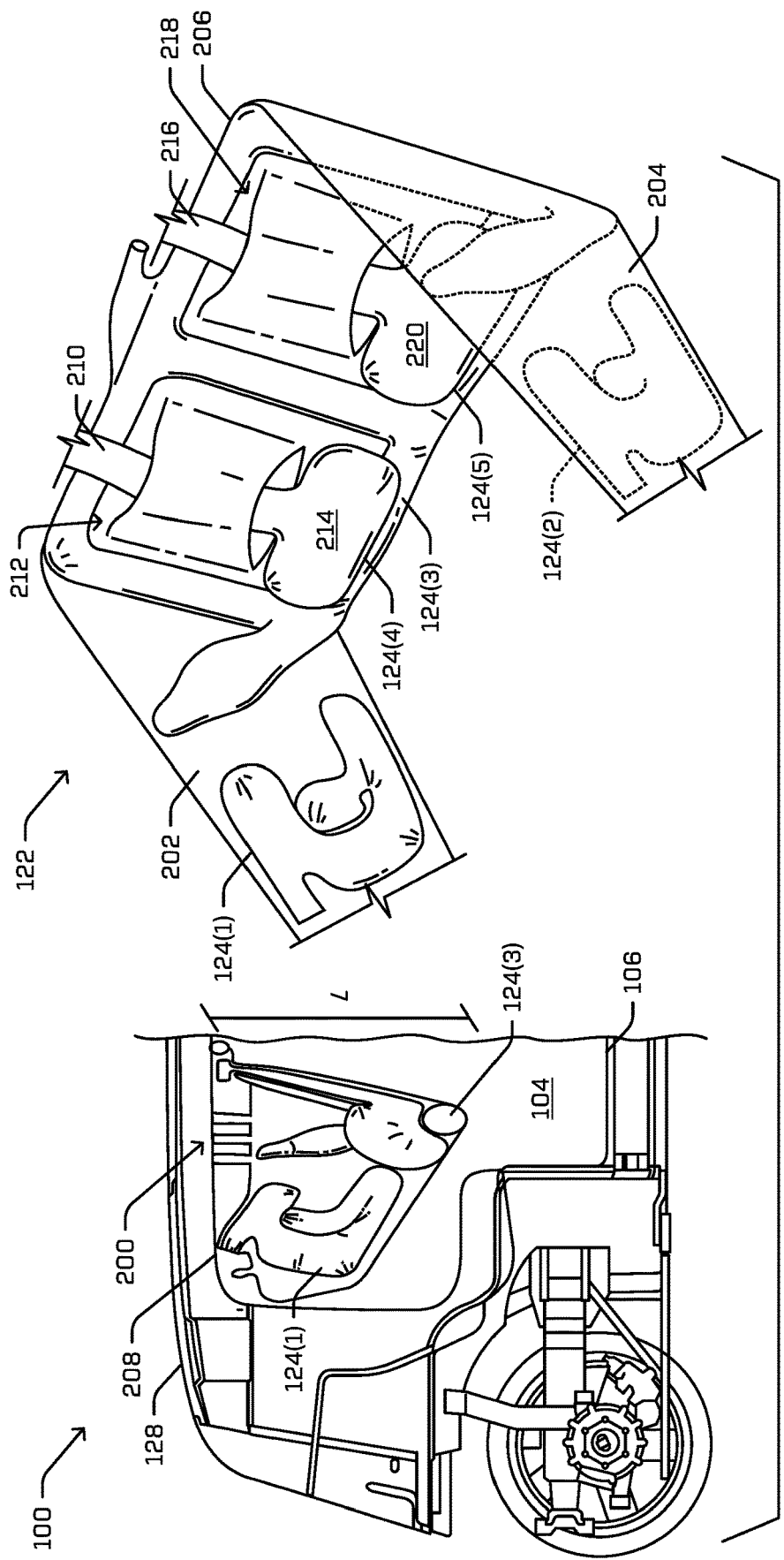
FIG. 2 illustrates a partial side view of the vehicle and the occupant protection system of FIG. 1, according to an example of the present disclosure. The occupant protection system, in some instances, is shown including an example expandable curtain and one or more example expandable bladders.

FIG. 2 is a side view of a portion of the example vehicle 100 shown in FIG. 1 with the occupants 118 omitted to aid clarity. FIG. 2 shows the expandable curtain 122 in the deployed (e.g., expanded) state in the interior 104 of the vehicle 100. For example, the expandable curtain 122 may be configured to be expanded from a stowed state, as shown in FIG. 1 within the vehicle roof 128, to a deployed state, for example, as shown in FIG. 2.

The expandable curtain 122 can be configured to be deployed from the vehicle roof 128 and can be coupled to the vehicle roof 128 at one or more attachment points 200. The coupling of the expandable curtain 122 to the vehicle roof 128 may allow the expandable curtain 122 to hang from the vehicle roof 128 and into the interior 104. Additionally, the coupling may secure the expandable curtain 122 (and/or the expandable bladders 124) to the vehicle 100 in the event of a collision to prevent (or reduce) the expandable curtain 122 shifting in the interior 104 during the collision, for example, as the occupant 118 contacts the expandable curtain 122, either directly or indirectly. The expandable curtain 122 can have a length L configured to extend between the vehicle roof 128 (or the ceiling 108) and the vehicle floor 106. As shown, the expandable curtain 122 extends toward the vehicle floor 106 and terminates at a location spaced above the vehicle floor 106.

The expandable curtain 122 can include a first expandable bladder 124(1), a second expandable bladder 124(2), and a third expandable bladder 124(3). In some instances, the first expandable bladder 124(1), the second expandable bladder 124(2), and the third expandable bladder 124(3) may be directly integrated with the expandable curtain 122 and may be filled via one or more of the inflators 130. The expandable curtain 122 may represent a single piece of woven material that forms the first expandable bladder 124(1), the second expandable bladder 124(2), and the third expandable bladder 124(3). In this sense, the first expandable bladder 124(1), the second expandable bladder 124(2), and the third expandable bladder 124(3) may represent certain portions, areas, or regions of the expandable curtain 122 that are inflated. In some instances, the first expandable bladder 124(1) may represent a first side airbag and the second expandable bladder 124(2) may represent a second side airbag. The third expandable bladder 124(3), as described herein, may include one or more horizontally-extending portions, one or more vertically-extending portions, and/or one or more diagonally-extending portions.

The expandable curtain 122 may include different portions, regions, panels, or sections on which the first expandable bladder 124(1), the second expandable bladder 124(2), and the third expandable bladder 124(3) are disposed. For example, the expandable curtain 122 may include a first side section 202, a second side section 204, and a front section 206. Collectively, the first side section 202, the second side section 204, and the front section 206 may form the expandable curtain 122. However, although described as separate sections, the first side section 202, the second side section 204, and the front section 206 may be formed of the single piece of woven material. In this sense, the first expandable bladder 124(1), the second expandable bladder 124(2), and the third expandable bladder 124(3) may be formed within the expandable curtain 122.

The first side section 202, in the deployed state, can be configured to extend along a portion of a first interior side 208 of the vehicle 100. For example, the first side section 202 of the expandable curtain 122 may extend in a direction substantially parallel to the first interior side 208 of the vehicle 100. In some instances, the first side section 202 (or the first expandable bladder 124(1)) can be configured to provide cushioning between the occupant 118 and the first interior side 208 of the vehicle 100 (e.g., a first side airbag). The expandable curtain 122 also includes the second side section 204 opposite the first side section 202 configured to extend along a portion of a second interior side (not shown in FIG. 2) of the vehicle 100. The first interior side 208 and the second interior side of the vehicle 100 may be on opposite sides of the vehicle 100 and may extend substantially parallel to one another.

The front section 206 extends between the first side section 202 and the second side section 204 of the expandable curtain 122. However, as noted above, the first side section 202, the second side section 204, and the front section 206 of the expandable curtain 122 form a contiguous barrier around the interior 104 of the vehicle 100. The first side section 202, the second side section 204, and the front section 206 may define a substantially horseshoe-shaped or U-shaped cross-sectional area. As will be explained herein, inflating the first expandable bladder 124(1), the second expandable bladder 124(2), and the third expandable bladder 124(3) may cause the expandable curtain 122 to deploy and drop down from the ceiling 108 (e.g., out of the vehicle roof 128). In some instances, the first side section 202 may extend substantially transverse from the front section 206, and/or the second side section 204 may extend substantially transverse from the front section 206.

The third expandable bladder 124(3) may be defined by one or more horizontal, vertical, or diagonal portions. When inflated, one or more horizontally-extending portions extend at least partially from the first interior side 208 to the second interior side of the vehicle 100, and one or more vertically-extending portions extend at least partially between the vehicle roof 128 and the vehicle floor 106. In some instances, the one or more horizontally-extending portions and the one or more vertically-extending portions may be disposed on the front section 206. In some instances, one or more diagonally-extending portions may be disposed on the first side section 202, the second side section 204, and/or the front section 206. In some instances, the one or more horizontally-extending portions, the one or more vertically-extending portions, and/or the one or more diagonally-extending portions may be inflated in unison, or at the same time. In this sense, the one or more horizontally-extending portions, the one or more vertically-extending portions, and/or the one or more diagonally-extending portions may represent portions of the third expandable bladder 124(3).

The occupant protection system 120 also includes a fourth expandable bladder 124(4) and a fifth expandable bladder 124(5). The fourth expandable bladder 124(4) and the fifth expandable bladder 124(5) may, in some instances, include a similar structure and/or shape. The fourth expandable bladder 124(4) and the fifth expandable bladder 124(5) may represent frontal airbags that are expanded (e.g., deployed). As will be discussed herein, the fourth expandable bladder 124(4) and the fifth expandable bladder 124(5) may be at least partially received by, or reside within, the expandable curtain 122. For example, the fourth expandable bladder 124(4) may include a first neck portion 210 that extends through a first slit, channel, or passage 212 of the expandable curtain 122. A first head portion 214 may fluidly connect with the first neck portion 210 and be positioned external to the first passage 212. Likewise, the fifth expandable bladder 124(5) may include a second neck portion 216 that extends through a second slit, channel, or passage 218 of the expandable curtain 122. A second head portion 220 may fluidly connect with the second neck portion 216 and be positioned external to the second passage 218.

The positioning of the first neck portion 210 and the second neck portion 216 through the first passage 212 and the second passage 218, respectively, may position the first expandable bladder 124(1) and the second expandable bladder 124(2) within the interior 104. Additionally, this may center the first head portion 214 and the second head portion 220 on the occupants 118. For example, the first head portion 214 and the second head portion 220 extend in a direction towards the occupant 118 such that in the event of a collision, the first head portion 214 and the second head portion 220 may receive heads of the occupants 118, respectively. As will be explained herein, the first expandable bladder 124(1), the second expandable bladder 124(2), the third expandable bladder 124(3), the fourth expandable bladder 124(4), and the fifth expandable bladder 124(5) may be inflated via respective inflators 130. Portions of the second expandable bladder 124(2), the third expandable bladder 124(3), and the fifth expandable bladder 124(5) are shown in dashed lines to indicate their position behind the second side section 204.

Figure 3:
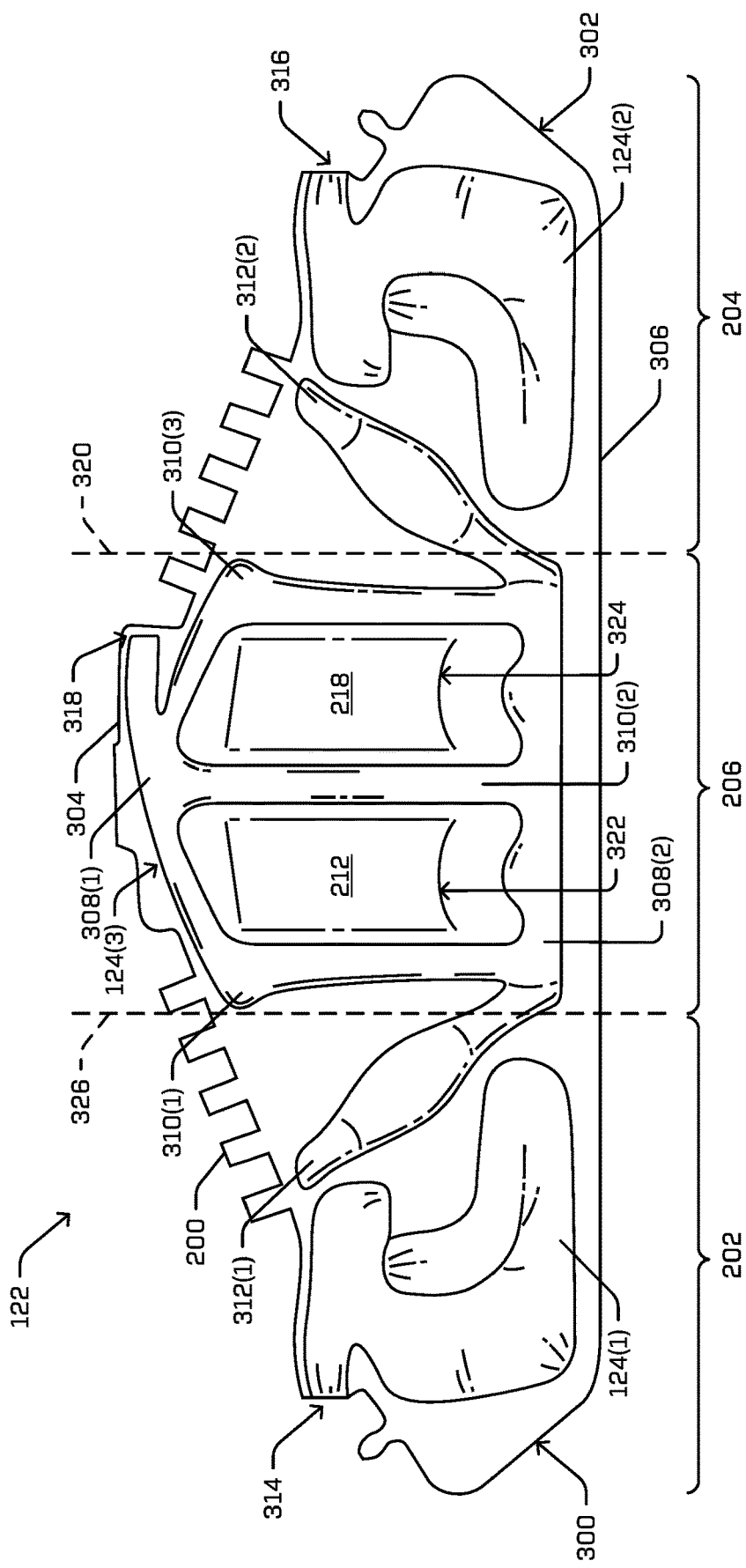
FIG. 3 illustrates a planar view of the expandable curtain and the one or more expandable bladders of FIG. 2 in unfolded and deflated state, according to an example of the present disclosure.

FIG. 3 illustrates the expandable curtain 122 with the expandable bladders 124. The view shown in FIG. 3 represents the expandable curtain 122 in a laid out, unfolded, or open state. For example, as introduced above, the expandable curtain 122 may represent a single piece of woven material. In FIG. 3, the expandable curtain 122 is laid flat on a surface to illustrate features of the expandable curtain 122 and the expandable bladders 124. Additionally, the fourth expandable bladder 124(4) and the fifth expandable bladder 124(5) are omitted for clarity.

The expandable curtain 122 generally represents a continuous piece of material that spans between a first side 300 and a second side 302 spaced apart from the first side 300.

The expandable curtain 122 may also have a top 304, a bottom 306 opposite the top 304. In some instances, the bottom 306 may be substantially planar, while the top 304 may include a parabolic shape, for example, between the first side 300 and the second side 302. The top 304 includes the attachment points 200 for coupling the expandable curtain 122 (as well as the expandable bladders 124) to the vehicle roof 128. As shown, the attachment points 200 may represent flange-type pieces of the expandable curtain 122 which are received with mounting brackets, clamps, and the like of the framework 132. The top 304 of the expandable curtain 122 may be coupled at any number of attachment points 200 that span across the first side section 202, the second side section 204, and/or the front section 206.

The expandable curtain 122 forms the first expandable bladder 124(1), which may represent a first side airbag positioned along the first interior side 208 of the vehicle 100. Additionally, the expandable curtain 122 forms the second expandable bladder 124(2), which may represent a second side airbag positioned along a second interior side of the vehicle 100. In this sense, being as the expandable curtain 122 may represent a single piece of woven material, portions of the single piece of woven material may be sewn, heat sealed, woven, or otherwise adjoined together to form the first expandable bladder 124(1) and the second expandable bladder 124(2).

Additionally, the third expandable bladder 124(3) may be formed within the expandable curtain 122. The third expandable bladder 124(3) can be located between the first expandable bladder 124(1) and the second expandable bladder 124(2). The third expandable bladder 124(3) may include one or more horizontally-extending portions 308, such as a first horizontally-extending portion 308(1) and a second horizontally-extending portion 308(2). Additionally, or alternatively, the third expandable bladder 124(3) may include one or more vertically-extending portions 310, such as a first vertically-extending portion 310(1), a second vertically-extending portion 310(2), and a third vertically-extending portion 310(3). In some instances, the first vertically-extending portion 310(1), the second vertically-extending portion 310(2), and the third vertically-extending portion 310(3) may extend transverse to the second horizontally-extending portion 308(2). Additionally, or alternatively, the third expandable bladder 124(3) may include one or more diagonally-extending portions 312, such as a first diagonally-extending portion 312(1) and a second diagonally-extending portion 312(2).

The one or more horizontally-extending portions 308, the one or more vertically-extending portions 310, and the one or more diagonally-extending portions 312 may make up or represent the third expandable bladder 124(3). In other words, the one or more horizontally-extending portions 308, the one or more vertically-extending portions 310, and the one or more diagonally-extending portions 312 may be in flow communication with one another such that the one or more horizontally-extending portions 308, the one or more vertically-extending portions 310, and the one or more diagonally-extending portions 312 are inflated together or in unison.

The first horizontally-extending portion 308(1) can be located proximate the top 304 of the expandable curtain 122, spaced apart from the bottom 306. In some instances, the first horizontally-extending portion 308(1) can be centered between the first side 300 and the second side 302. As shown the first horizontally-extending portion 308(1) may curve or bend to match a contour of the top 304. The second horizontally-extending portion 308(2) can be located proximate the bottom 306 of the expandable curtain 122, spaced apart from the top 304. In some instances, the second horizontally-extending portion 308(1) can be centered between the first side 300 and the second side 302.

The first vertically-extending portion 310(1) can be located more proximate to the first side 300 than the second side 302. The first vertically-extending portion 310(1) may extend between the first horizontally-extending portion 308(1) and the second horizontally-extending portion 308(2). The second vertically-extending portion 310(2) can be centered between the first side 300 and the second side 302. The second vertically-extending portion 310(2) may extend between the first horizontally-extending portion 308(1) and the second horizontally-extending portion 308(2). The third vertically-extending portion 310(3) can be located more proximate to the second side 302 than the first side 300. The third vertically-extending portion 310(3) may extend between the first horizontally-extending portion 308(1) and the second horizontally-extending portion 308(2), at a location or opposite end of where the first vertically-extending portion 310(1) can be adjoined to the first horizontally-extending portion 308(1) and the second horizontally-extending portion 308(2).

The first diagonally-extending portion 312(1) extends from an intersection of the first horizontally-extending portion 308(1) and the first vertically-extending portion 310(1). As shown, the first diagonally-extending portion 312(1) may extend in a direction towards the first side 300 and the top 304 of the expandable curtain 122. The second diagonally-extending portion 312(2) extends from an intersection of the second horizontally-extending portion 308(2) and the second vertically-extending portion 310(2). As shown, the second diagonally-extending portion 312(2) may extend in a direction towards the second side 302 and the top 304 of the expandable curtain 122. In some instances, the first diagonally-extending portion 312(1) and the second-diagonally extending portion 312(2) may counteract forces experienced by the expandable curtain 122 in the event of a collision (and when the occupant 118 contacts the fourth expandable bladder 124(4) and the fifth expandable bladder 124(5). The first diagonally-extending portion 312(1) and the second-diagonally extending portion 312(2) may also serve to rigidize the expandable curtain 122 during the collision.

In some instances, each of the first expandable bladder 124(1), the second expandable bladder 124(2), and the third expandable bladder 124(3) may be separately inflated via respective inflators. The first expandable bladder 124(1) can include a first inlet 314 that extends from the second horizontally-extending portion 308(2), the second expandable bladder 124(2) can include a second inlet 316, and the third expandable bladder 124(3) can include a third inlet 318. In some instances, the first inlet 314, the second inlet 316, and/or the third inlet 318 may be located along the top 304 of the expandable curtain 122. The first inlet 314, the second inlet 316, and/or the third inlet 318 may be formed within the expandable curtain 122, and/or include couplings for fluidly connecting with the inflators 130, respectively.

As introduced above, the expandable curtain 122 may include different panels, portions, or sections that collectively form the expandable curtain 122. For example, the first side section 202, the second side section 204, and the front section 206 may form the expandable curtain 122. In some instances, the first expandable bladder 124(1) can be disposed or located on the first side section 202, the second expandable bladder 124(2) can be disposed or located on the second side section 204, and the third expandable bladder 124(3) can be disposed or located on the first side section 202, the second side section 204, and the front section 206. More particularly, the vertically-extending portions 310 and the horizontally-extending portion 308 may be disposed on the front section 206, while the first diagonally-extending portion 312(1) may be disposed or located on the first side section 202, and the second diagonally-extending portion 312(2) may be disposed or located on the second side section 204.

Although described as separate sections, the first side section 202, the second side section 204, and the front section 206 are formed within a single piece of material that represents the expandable curtain 122. However, the first side section 202, the second side section 204, and the front section 206 may represent different sides or faces of the expandable curtain 122 when coupled to the vehicle roof 128. For example, at a first fold line 326 may be located between the first side section 202 and the front section 206, while a second fold line 320 may be located between the second side section 204 and the front section 206. That is, the creases, folds, or bends in the expandable curtain 122 at the first fold line 326 and the second fold line 320 may produce or separate the first side section 202, the second side section 204, and the front section 206.

The expandable curtain 122 also defines passages that receive the fourth expandable bladder 124(4) and the fifth expandable bladder 124(5). As introduced above, the expandable curtain 122 may include the first passage 212 for receiving the first neck portion 210 of the fourth expandable bladder 124(4), and the second passage 218 for receiving the second neck portion 216 of the fifth expandable bladder 124(5). The first passage 212 and the second passage 218 can be formed within portions of the expandable curtain 122 that are not inflated. However, additionally or alternatively, in some instances, the first passage 212 and/or the second passage 218 may be formed within portions of the expandable curtain 122 that are inflatable. The first passage 212 may be formed via first slits 322 disposed in the expandable curtain 122. The first slits 322 may be spaced apart from one another, between the top 304 and the bottom 306, such that the first neck portion 210 can be capable of being routed through the first passage 212. The first slits 322 may include sufficient length for receiving a width of the first neck portion 210 and may be sized such that a head portion, such as the first head portion 214, may not pass through the passage 212 (such as when inflated). As shown the first passage 212 may be located between the first horizontally-extending portion 308(1), the second horizontally-extending portion 308(2), the first vertically-extending portion 310(1), and the second vertically-extending portion 310(2).

Similarly, the second passage 218 may be formed via second slits 324 disposed in the expandable curtain 122. The second slits 324 may be spaced apart from one another, between the top 304 and the bottom 306, such that the second neck portion 216 can be capable of being routed through the second passage 218. The second slits 324 may include sufficient length for receiving a width of the second neck portion 216. As shown the second passage 218 may be located between the first horizontally-extending portion 308(1), the second horizontally-extending portion 308(2), the second vertically-extending portion 310(2), and the third vertically-extending portion 310(3).

Figure 4:
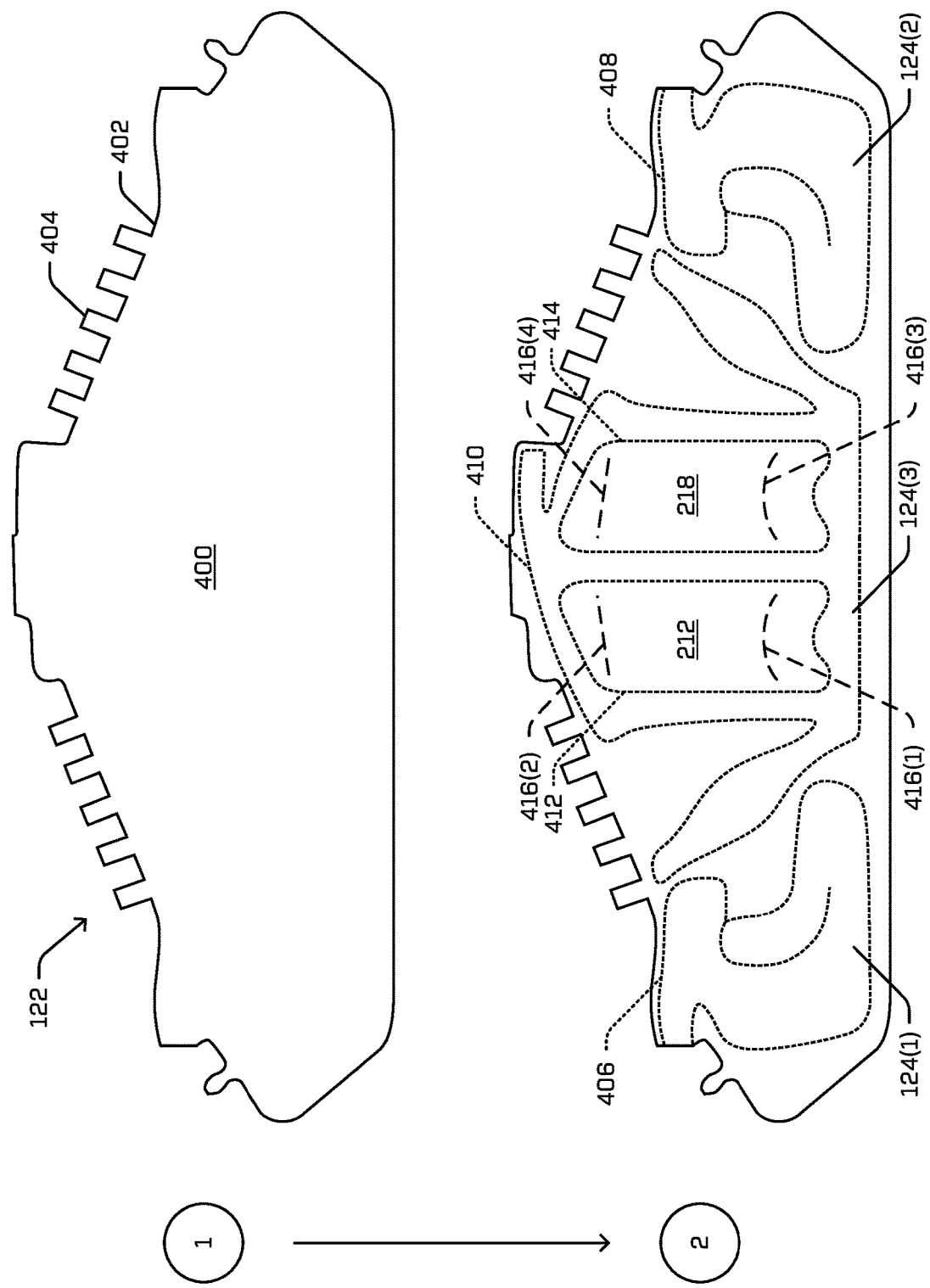
FIG. 4 illustrates a planar view of the expandable curtain and the one or more expandable bladders of FIG. 2 in unfolded and deflated state, according to an example of the present disclosure.

FIG. 4 illustrates a process to form the expandable curtain 122. As introduced above, the expandable curtain 122 may be formed of a single piece of woven material 400. In some instances, the woven material 400, commonly referred to as a one piece woven (OPW), may be formed from yarns of at least nylon, polypropylene, and/or polyester. In some instances, the woven material 400 may include multiple layers, such as two, three, four, and so forth that are weaved or laminated together.

The woven material 400 can include a perimeter 402 that corresponds to a shape or outline of the expandable curtain 122. The perimeter 402 may form the sides of the expandable curtain 122, as well as flanges 404 for the attachment points 200. In some instances, the perimeter 402, or more generally the shape of the expandable curtain 122, can be formed via cutting, stamping, or other means. For example, at "1" a piece of woven material may be cut to form the perimeter 402 of the expandable curtain 122.

At "2", the woven material 400 can be processed to form the expandable bladders 124, as well as the first passage 212 and the second passage 218. For example, portions of the woven material 400 may be interconnected by stitching or ultrasonic welding, to form connections or seams that define the expandable bladders 124. However, in other instances, panels of the woven material are woven together to form connections or seams that help define the expandable bladders 124 of the expandable curtain 122.

A first interconnect 406 can correspond to the first expandable bladder 124(1), and a second interconnect 408 can correspond to the second expandable bladder 124(2). Here, the first interconnect 406 and the second interconnect 408 represent portions of the woven material 400 that are interconnected to form the first expandable bladder 124(1) and the second expandable bladder 124(4), respectively.

Likewise, a third interconnect 410 may correspond to an exterior interconnect of the third expandable bladder 124(3). A fourth interconnect 412 may correspond to a first interior interconnect of the third expandable bladder 124(3), and a fifth interconnect 414 may correspond to a second interior interconnect of the third expandable bladder 124(3). Collectively, the third interconnect 410, the fourth interconnect 412, and the fifth interconnect 414 form the third expandable bladder 124(3).

In some instances, the woven material 400, or the portions of the woven material 400 corresponding to the expandable bladders 124, may be sealed to prevent leakage of fluids through the woven material 400. For example, spray coatings and/or one or more laminated layers (e.g., films) may be applied. In some instances, the spray coatings and/or the film layers may be applied to both sides (e.g., outward facing side and/or inward facing side).

To form the first passage 212 and the second passage 218, the woven material 400 may be cut along a first line 416(1), a second line 416(2), a third line 416(3), and a fourth line 416(4), respectively. In some instances, the cuts along the first line 416(1), the second line 416(2), the third line 416(3), and the fourth line 416(4) may only sever a top layer of the woven material 400, such that the cut does not go through an entire thickness of the woven material 400. For example, the cuts may only sever one layer of the woven material 400. Once cut, the first line 416(1) and the second line 416(2) may form the first slits 322, and the third line 416(3) and the fourth line 416(4) may form the second slits 324. In some instances, the first slits 322 and the second slits 324 may represent cut lines that are spaced from each other, respectively, through one of the layers of the woven material 400, to form the first passage 212 and the second passage 218 between the two layers. Alternatively, the first slits 322 and the second slits 324 may be all the way through the woven material 400, such that the first neck portion 210 and the second neck portion 216 can be "behind" the expandable curtain 122. Still, in some instances, the first passage 212 and/or the second passage 216 may be formed by sewing (or otherwise attaching) a secondary piece onto the woven material 400 and/or by sealing the woven material 400 on one side or the other to partition between inflatable and non-inflatable portions.

Although the interconnects, or the expandable bladders are shown including a certain shape, other shapes are envisioned. Moreover, the expandable curtain 122 may include more than or less than the number of interconnects shown.

Figure 5:
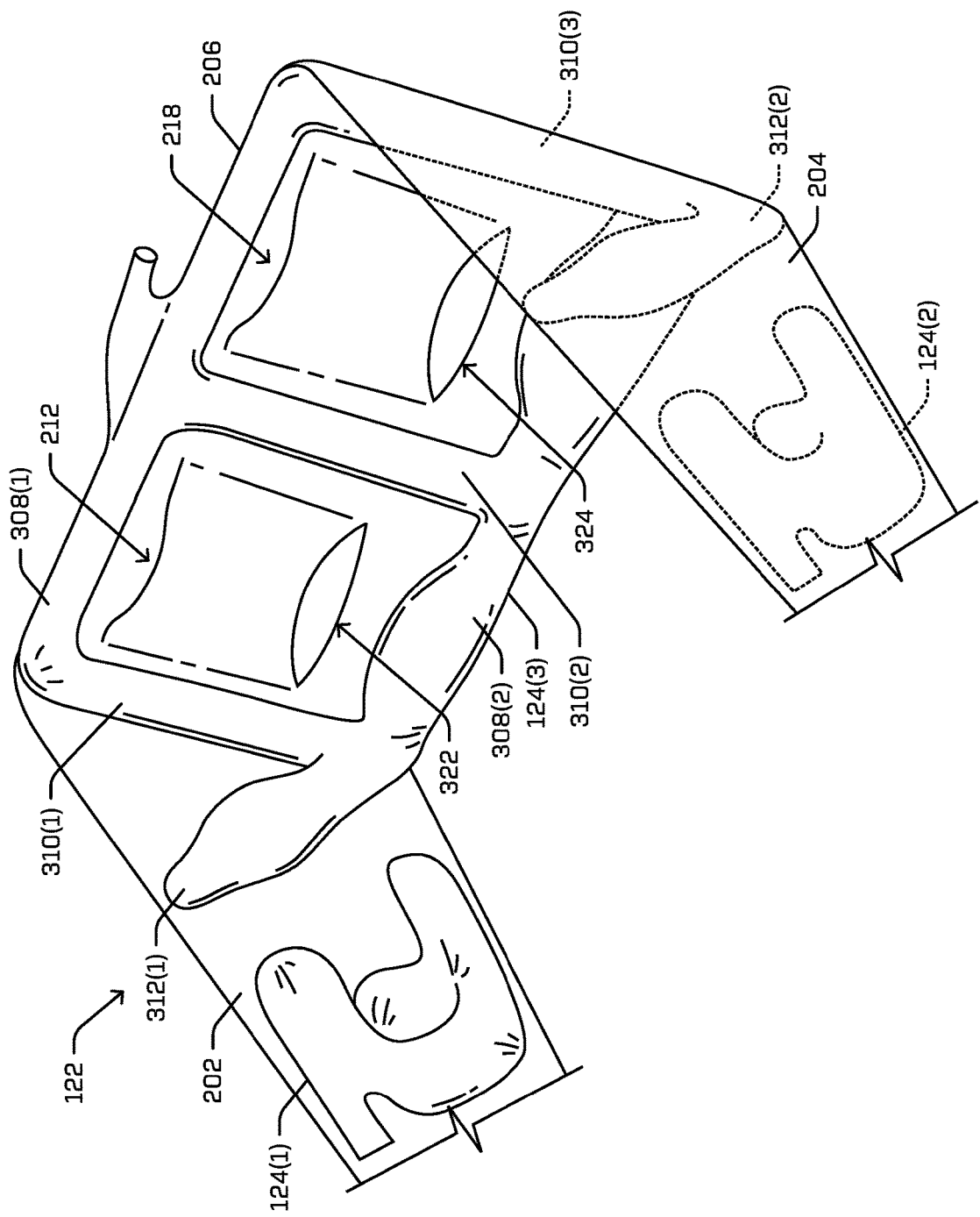
FIG. 5 illustrates a perspective view showing one or more of the expandable bladders being uncoupled from the expandable curtain of FIG. 2, according to an example of the present disclosure.

FIG. 5 illustrates a perspective view of the expandable curtain 122 in a deployed state. In FIG. 5, the fourth expandable bladder 124(4) and the fifth expandable bladder 124(5) are shown removed to better illustrate the third expandable bladder 124(3). Additionally, portions of the second expandable bladder 124(2) and the third expandable bladder 124(3) are shown in dashed lines to indicate their position behind the second side section 204.

The expandable curtain 122 can be folded at the first fold line 326 and the second fold line 320 (as discussed above in FIG. 4). In doing so, the expandable curtain 122 may include the first side section 202 that can be disposed along the first interior side 208 of the vehicle 100, the second side section 204 that can be disposed along the second interior side of the vehicle 100, and the front section 206 that extends between the first side section 202 and the second side section 204. The first passage 212 and the second passage 218 are shown being formed by the first slits 322 and the second slits 324, respectively, for receiving the fourth expandable bladder 124(4) and the fifth expandable bladder 124(5), respectively.

In some instances, the horizontally-extending portions 308, the vertically-extending portions 310, and the diagonally-extending portions 312, once inflated, include cylindrical cross-sectional shapes. In some instances, the horizontally-extending portions 308, the vertically-extending portions 310, and the diagonally-extending portions 312 may include a similar cross-sectional size and/or shape, and/or a different cross-sectional size and/or shape. Additionally, the horizontally-extending portions 308, the vertically-extending portions 310, and/or the diagonally-extending portions 312 may include bulbous portions in which the cross-sectional size and/or shape changes. In some instances, the bulbous portions may provide additional cushion to respective portions of the expandable bladders 124, and/or may assist in locating the fourth expandable bladder 124(4) and/or the fifth expandable bladder 124(5) once coupled to the expandable curtain 122. The diagonally-extending portions 312 are also shown extending onto the first side section 202 and the second side section 204, respectively.

Figure 6:
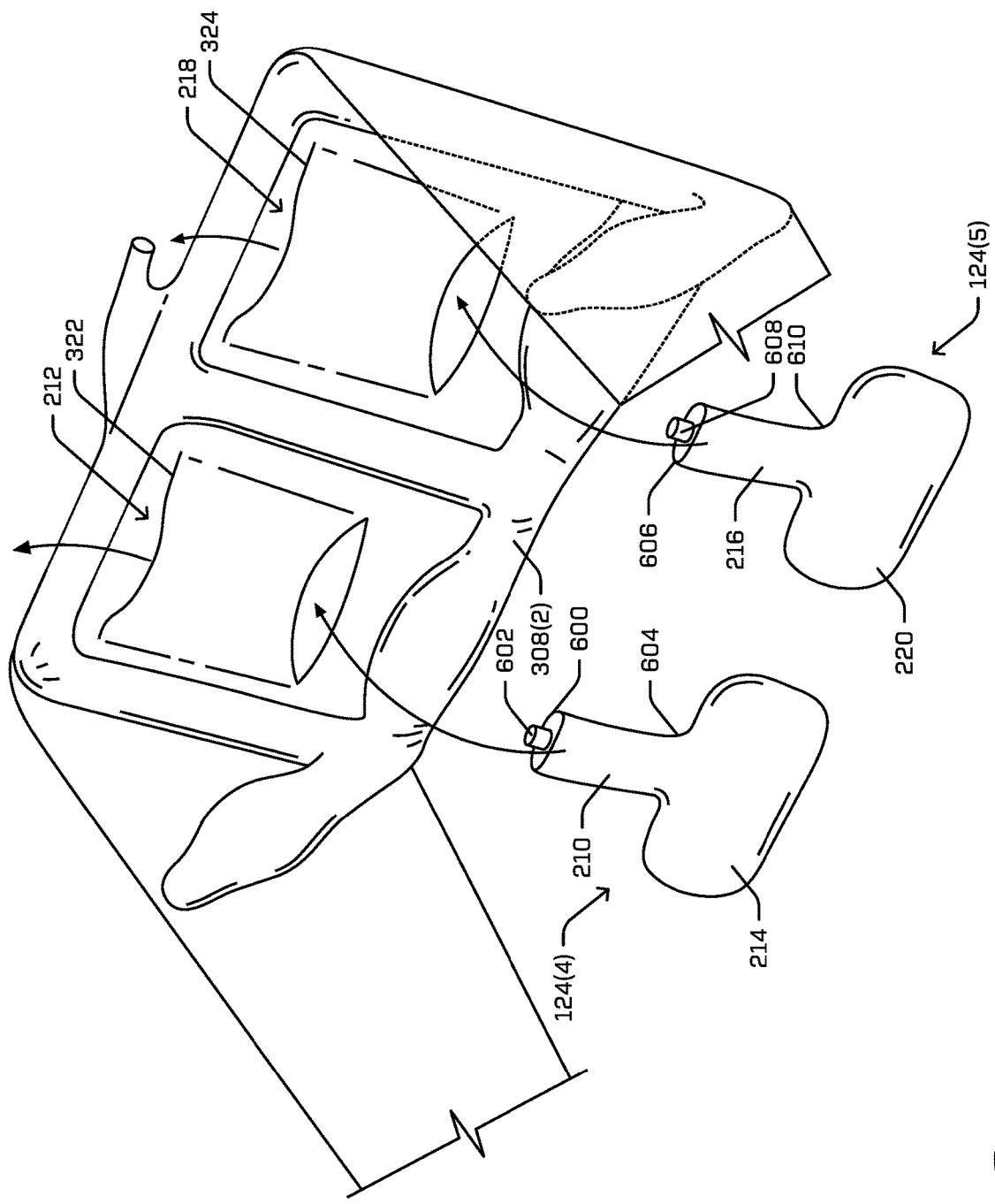
FIG. 6 illustrates a perspective view showing an example diagram for coupling one or more of the expandable bladders to the expandable curtain of FIG. 2, according to an example of the present disclosure.

FIG. 6 illustrates a perspective view of the expandable curtain 122, and more particularly, a routing of the fourth expandable bladder 124(4) and the fifth expandable bladder 124(5) through the first passage 212 and the second passage 218, respectively. Portions of the third expandable bladder 124(3) to indicate their position behind the second side section 204.

The fourth expandable bladder 124(4) includes the first neck portion 210 that routes through, or can be at least partially received within, the first passage 212. For example, the fourth expandable bladder 124(4) includes a first distal end 600 that may pass through a first of the first slits 322, through or within the first passage 212, and then exit through a second of the first slits 322. In doing so, a length of the first neck portion 210 can be received within the first passage 212. The first distal end 600 resides external to the expandable curtain 122 and includes a fourth inlet 602 for fluidly connecting to the inflator(s) 130 (e.g., a fourth inflator). A first proximal end 604 of the first neck portion 210 can be in flow communication with the first head portion 214. Upon being coupled to the expandable curtain 122, the first head portion 214 can be disposed external to the first passage 212. Additionally, the first head portion 214 may reside in front of, or on top of, the second horizontally-extending portion 308(2), the first vertically-extending portion 310(1), and/or the second vertically-extending portion 310(2).

Likewise, the fifth expandable bladder 124(5) includes the second neck portion 216 that routes through, or can be at least partially received within, the second passage 218. For example, the fifth expandable bladder 124(5) includes a second distal end 606 that may pass through a first of the second slits 324, through or within the second passage 218, and then exit through a second of the second slits 324. In doing so, a length of the second neck portion 216 can be received within the second passage 218. The second distal end 606 resides external to the expandable curtain 122 and includes a fifth inlet 608 for fluidly connecting to the inflator(s) 130 (e.g., a fifth inflator). A second proximal end 610 of the second neck portion 216 can be in flow communication with the second head portion 220. Upon being coupled to the expandable curtain 122, the second head portion 220 can be disposed external to the second passage 218. Additionally, the second head portion 220 may reside in front of, or on top of, the second horizontally-extending portion 308(2), the second vertically-extending portion 310(2), and/or the third vertically-extending portion 310(3).

The routing of the fourth expandable bladder 124(4) and the fifth expandable bladder 124(5) through the expandable curtain 122 may assist in centering, locating, or positioning the fourth expandable bladder 124(4) and the fifth expandable bladder 124(5) during deployment as well as in the event of a collision. For example, routing the first neck portion 210 through the first passage 212 and the second neck portion 216 through the second passage 218 may secure the fourth expandable bladder 124(4) and the fifth expandable bladder 124(5) to (e.g., against) the expandable curtain 122. In doing so, during deployment, the fourth expandable bladder 124(4) and the fifth expandable bladder 124(5) may be located in front of the occupants 118 and centered on the occupants 118. Moreover, during a collision, and upon the occupants 118 contacting the fourth expandable bladder 124(4) and the fifth expandable bladder 124(5), respectively, the routing of the first neck portion 210 and the second neck portion 216 through the first passage 212 and the second passage 218, respectively, may prevent the first head portion 214 and the second head portion 220 shifting (e.g., laterally).

In some instances, the fourth expandable bladder 124(4) and the fifth expandable bladder 124(5) represent separate bladders that are inflated separately to reduce an impact or effect on one another. For example, if an adult is sitting in a seat adjacent to the fourth expandable bladder 124(4), and a child is sitting in a seat adjacent to the fifth expandable bladder 124(5), a force applied to the fourth expandable bladder 124(4) during a collision may not be imparted to the fifth expandable bladder 124(5). By separately inflating the fourth expandable bladder 124(4) and the fifth expandable bladder 124(5), the expandable bladders may be independent from one another to limit the effects of forces experienced by one of the fourth expandable bladder 124(4) and the fifth expandable bladder 124(5), to another of the fourth expandable bladder 124(4) and the fifth expandable bladder 124(5).

A width of the first neck portion 210 may be less than a width of the first head portion 214, and/or a width of the second neck portion 216 may be less than a width of the second head portion 220. The relative widths may cause the first head portion 214 and the second head portion 220 to inflate at a faster rate. In some instances, the first head portion 214 may inflate prior to the first neck portion 210, and/or the second head portion 220 may inflate prior to the second neck portion 216.

Figure 7:
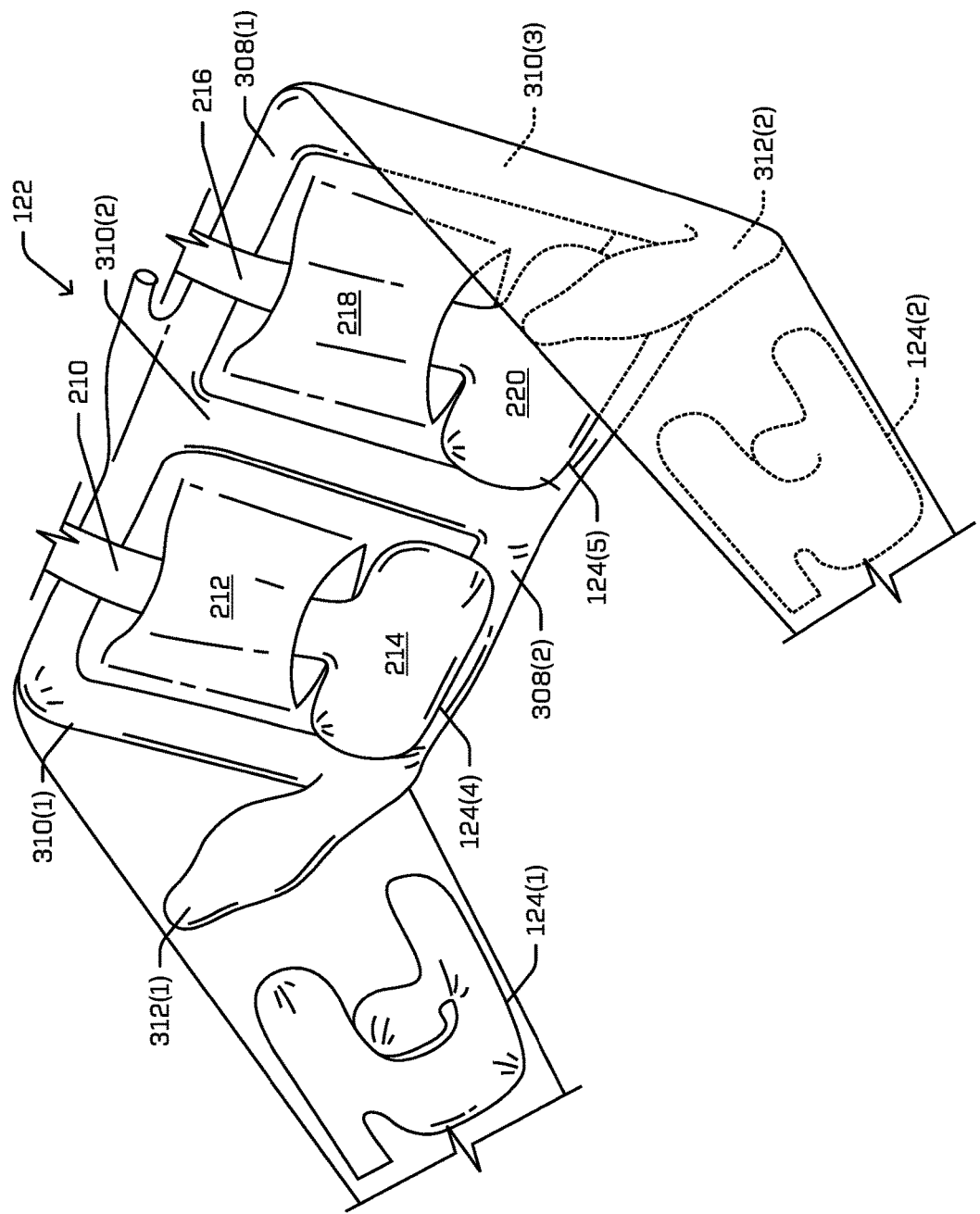
FIG. 7 illustrates a perspective view of the expandable curtain and the one or more expandable bladders of FIG. 2, according to an example of the present disclosure.

FIG. 7 illustrates the fourth expandable bladder 124(4) and the fifth expandable bladder 124(5) being coupled to the expandable curtain 122. For example, once the first neck portion 210 and the second neck portion 216 are fed through the first passage 212 and the second passage 218, the fourth expandable bladder 124(4) and the fifth expandable bladder 124(5) may be coupled to the expandable curtain 122. In doing so, the first head portion 214 and the second head portion 220 are positioned to receive the head of the occupant 118 in the event of a collision. Portions of the second expandable bladder 124(2), the third expandable bladder 124(3), and the fifth expandable bladder 124(5) are shown in dashed lines to indicate their position behind the second side section 204.

In some instances, once the expandable bladders 124 are inflated, the fourth expandable bladder 124(4) and the fifth expandable bladder 124(5) may abut or contact one another, as well as the third expandable bladder 124(3). For example, once inflated, the first head portion 214 may contact the first diagonally-extending portion 312(1) (or a part thereof), the second horizontally-extending portion 308(2) (or a part thereof), the first vertically-extending portion 310(1) (or a part thereof), the second vertically-extending portion 310(2) (or a part thereof), and/or the second head portion 220 (or a part thereof). Likewise, once inflated, the second head portion 220 may contact the second diagonally-extending portion 312(2) (or a part thereof), the second horizontally-extending portion 308(2) (or a part thereof), the second vertically-extending portion 310(2) (or a part thereof), the third vertically-extending portion 310(3) (or a part thereof), and/or the first head portion 214 (or a part thereof). In some instances, this may assist in securing a position of the first neck portion 210 and the second neck portion 216 to, for example, prevent the first neck portion 210 and the second neck portion 216 laterally translating during a collision.

Figure 8:
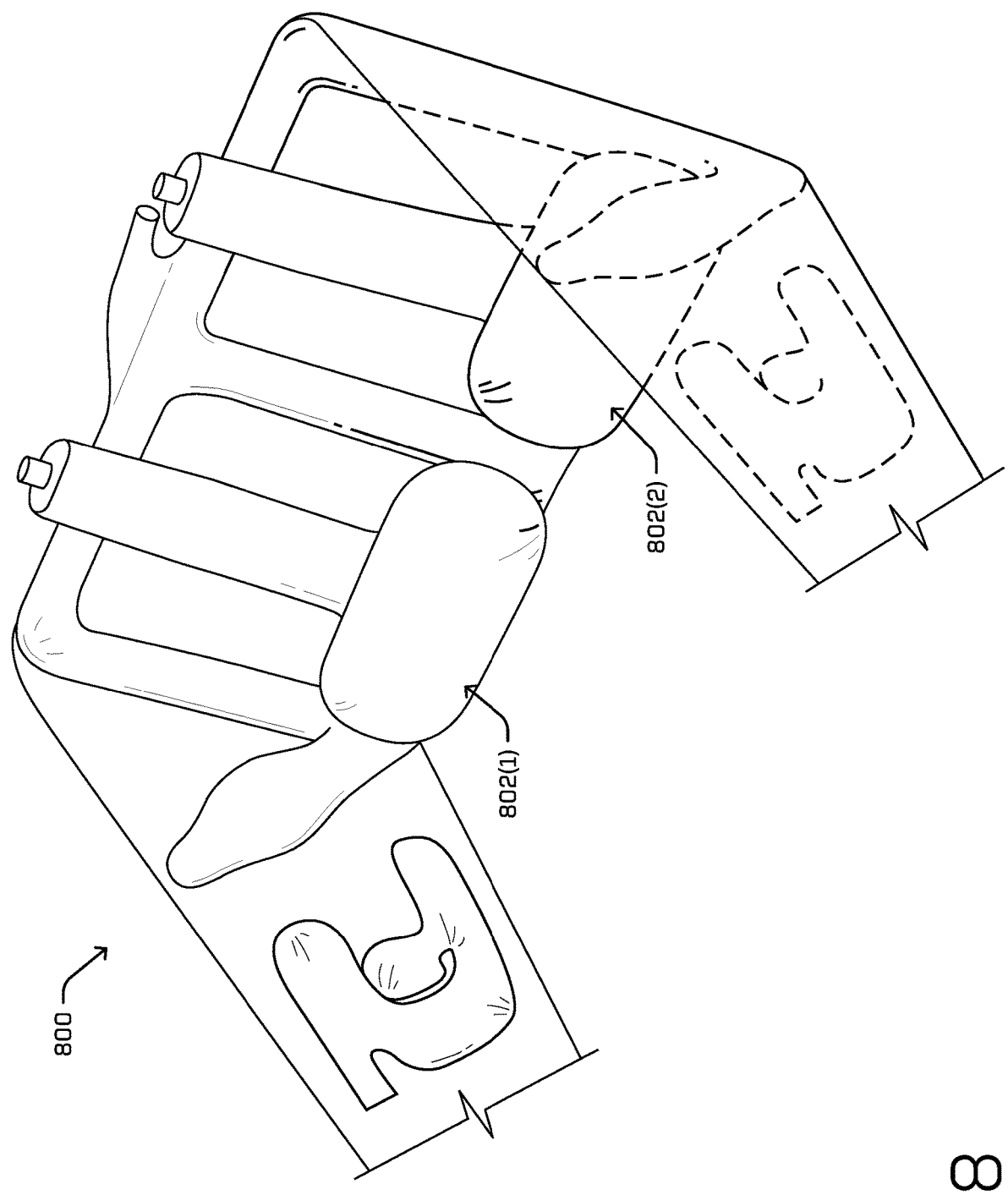
FIG. 8 illustrates a perspective view of an alternative example occupant protection system, according to an example of the present disclosure.

FIG. 8 illustrates an alternative expandable curtain 800 and expandable bladders 802. In some instances, the expandable curtain 800 and/or the expandable bladders 802 may be similar to the expandable curtain 122 and the expandable bladders 124, respectively, as discussed above with regard to FIGS. 1-7.

However, the expandable curtain 800 is shown having a first expandable bladder 802(1) and the second expandable bladder 802(2) being directly integrated with or coupled to the expandable curtain 800. The first expandable bladder 802(1) and the second expandable bladder 802(2) may be similar to the fourth expandable bladder 124(4) and the fifth expandable bladder 124(5), respectively. The expandable curtain 800 may not include slits (e.g., the first slits 322 and/or the second slits 324 as discussed above with the expandable curtain 122), but instead, the first expandable bladder 802(1) and the second expandable bladder 802(2) may be coupled to the expandable curtain 800. In this instance, being as first expandable bladder 802(1) and the second expandable bladder 802(2) are directly coupled to the expandable curtain 800, the neck portions of first expandable bladder 802(1) and the second expandable bladder 802(2) may not be fed through the passages to secure the first expandable bladder 802(1) and the second expandable bladder 802(2) to the expandable curtain 800. However, in some instances, the neck portions may directly couple to the expandable curtain 800 and fed through the passages, respectively.

In this instance, the neck portions of first expandable bladder 802(1) and the second expandable bladder 802(2) may be coupled to the expandable curtain 800. In some instances, the head portions of first expandable bladder 802(1) and the second expandable bladder 802(2) may be decoupled the expandable curtain 800. Instead, the neck portions of first expandable bladder 802(1) and the second expandable bladder 802(2) may be sewn, heat sealed, or other coupled to the expandable curtain 800. In some instances, directly coupling the first expandable bladder 802(1) and the second expandable bladder 802(2) to the expandable curtain 800 may reduce a thickness of the expandable curtain 800 at locations where first expandable bladder 802(1) and the second expandable bladder 802(2) are disposed. However, the first expandable bladder 802(1) and the second expandable bladder 802(2) may still include separate inlets for being inflated. In other respects, the expandable curtain 800 may be similar to the expandable curtain 122. Additionally, the neck portion of the first expandable bladder 802(1) and the second expandable bladder 802(2) may route over, under, or through horizontal portions of other expandable bladders of the expandable curtain 800 (e.g., the third expandable bladder 124(3).

Figure 9:
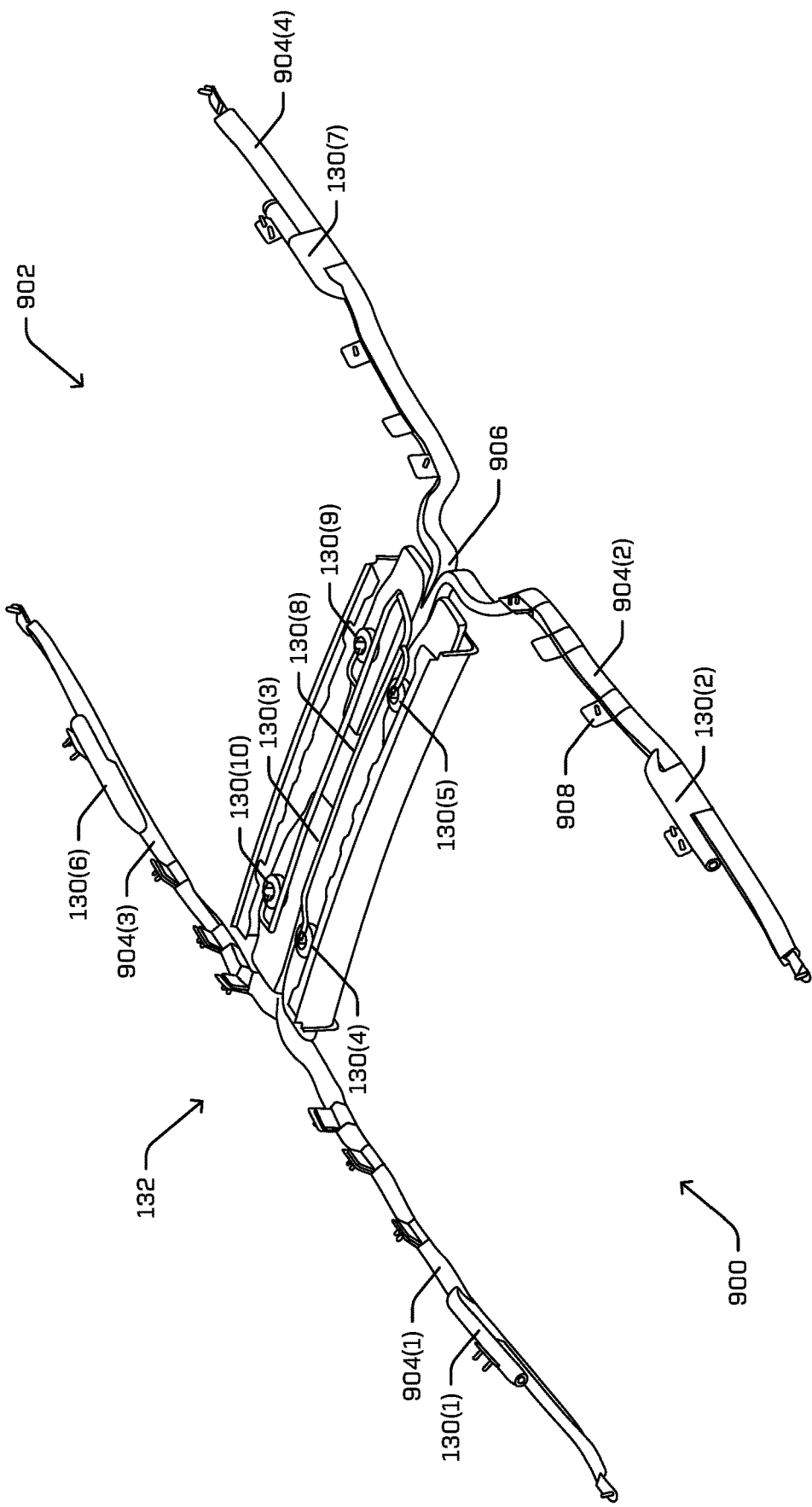
FIG. 9 illustrates a perspective view of an example framework of the occupant protection system for coupling the expandable curtain to the vehicle of FIG. 1, as well as for inflating the one or more expandable bladders, according to an example of the present disclosure.

FIG. 9 illustrates the framework 132 and components of the deployment system 126 used to deploy the expandable curtain 122 and the expandable bladders 124. The framework 132 and the deployment system 126 may be disposed, or at least partially disposed, within the vehicle roof 128 and vertically above the interior 104 of the vehicle 100.

In some instances, the framework 132 can be configured to receive more than one expandable curtain 122 (and respective expandable bladders 124). For example, the framework 132 may define a first area 900 for receiving a first expandable curtain (e.g., a first of the expandable curtain(s) 122), and a second area 902 for receiving a second expandable curtain (e.g., a second of the expandable curtains 122).

The framework 132 can include a first member 904(1), a second member 904(2), a third member 904(3), and a fourth member 904(4). The first member 904(1), the second member 904(2), the third member 904(3), and the fourth member 904(4) may be coupled (e.g., welded, fasteners, etc.) to another via one or more cross-members 906. In some instances, the first member 904(1), the second member 904(2), the third member 904(3), and the fourth member 904(4) may be formed from a single piece of material. The first member 904(1), the second member 904(2), the third member 904(3), and the fourth member 904(4) may be coupled to the body 102 of the vehicle 100 using fasteners, for example. The first member 904(1) and the second member 904(2), as well as the one or more cross-members 906, may define the first area 900 and receive a first of the expandable curtain(s) 122. The third member 904(3) and the fourth member 904(4), as well as the one or more cross-members 906, may define the second area 902 and receive a second of the expandable curtain(s) 122.

One or more clamps 908 are shown being disposed about the first member 904(1), the second member 904(2), the third member 904(3), and the fourth member 904(4). The clamps 908 are positioned to receive the flanges 404 of the expandable curtain 122. For example, the clamps 908 may include two adjacent surfaces that are brought together to compress (e.g., clamp) portions of the expandable curtain 122 corresponding to the flanges 404. When clamped, the flanges 404 are compressed within the clamp 908 to secure the expandable curtain 122. Therein, when deployed, the expandable curtain 122 may drop down or expand from the ceiling 108 and into the interior 104 of the vehicle 100.

As an example, attachment points 200 on the first side section 202 of the expandable curtain 122 may be received within clamps 908 on the first member 904(1), attachment points 200 on the second side section 204 of the expandable curtain 122 may be received within clamps 908 on the second member 904(2), and/or attachment points 200 on the front section 206 of the expandable curtain 122 may be received within clamps 908 on the one or more cross-members 906. In some instances, each of the first member 904(1), the second member 904(2), the third member 904(3), and the fourth member 904(4) may include three clamps for clamping respective flanges of the expandable curtain 122 (as well as an additional expandable curtain). More clamps 908, or attachment points 200, may be included. Additionally, in some instances, the one or more cross-members 906 may include clamps 908 for coupling to a portion of the expandable curtain 122.

The inflators 130 are configured to inflate the expandable curtain 122 and the expandable bladders 124 in the event of a collision or upon a collision being imminent. In some instances, a first inflator 130(1) couples to the first member 904(1) and can be in fluid connection with the first expandable bladder 124(1). A second inflator 130(2) couples to the second member 904(2) and can be in fluid connection with the second expandable bladder 124(2). A third inflator 130(3) couples to the one or more cross-members 906 and can be in fluid connection with the third expandable bladder 124(3). A fourth inflator 130(4) couples to the one or more cross-members 906 and can be in fluid connection with the fourth expandable bladder 124(4). A fifth inflator 130(5) couples to the one or more cross-members 906 and can be in fluid connection with the fifth expandable bladder 124(5). The first inflator 130(1), the second inflator 130(2), the third inflator 130(3), the fourth inflator 130(4), and the fifth inflator 130(5) may inflate expandable bladders 124 within the first area 900, or coupled (whether directly or indirectly) to a first of the expandable curtain(s) 122.

Within the second area 902, additional inflators 130 may inflate expandable bladders 124 coupled (whether directly or indirectly) to a second of the expandable curtain(s) 122. For example, a sixth inflator 130(6) couples to the third member 904(3) and can be in fluid connection with another first expandable bladder 124(1). A seventh inflator 130(7) couples to the fourth member 904(4) and can be in fluid connection with another second expandable bladder 124(2). An eighth inflator 130(8) couples to the one or more cross-members 906 and can be in fluid connection with another third expandable bladder 124(3). A ninth inflator 130(9) couples to the one or more cross-members 906 and can be in fluid connection with another fourth expandable bladder 124(4). A tenth inflator 130(10) couples to the one or more cross-members 906 and can be in fluid connection with another fifth expandable bladder 124(5).

The inflators 130 may include represent containers (e.g., vessels, canisters, etc.) that hold propellants or other fluids for inflating the expandable bladders 124. Various conduits (e.g., pipes, hosing, etc.) may be included for routing the propellants to the expandable bladders 124.

Figure 10:
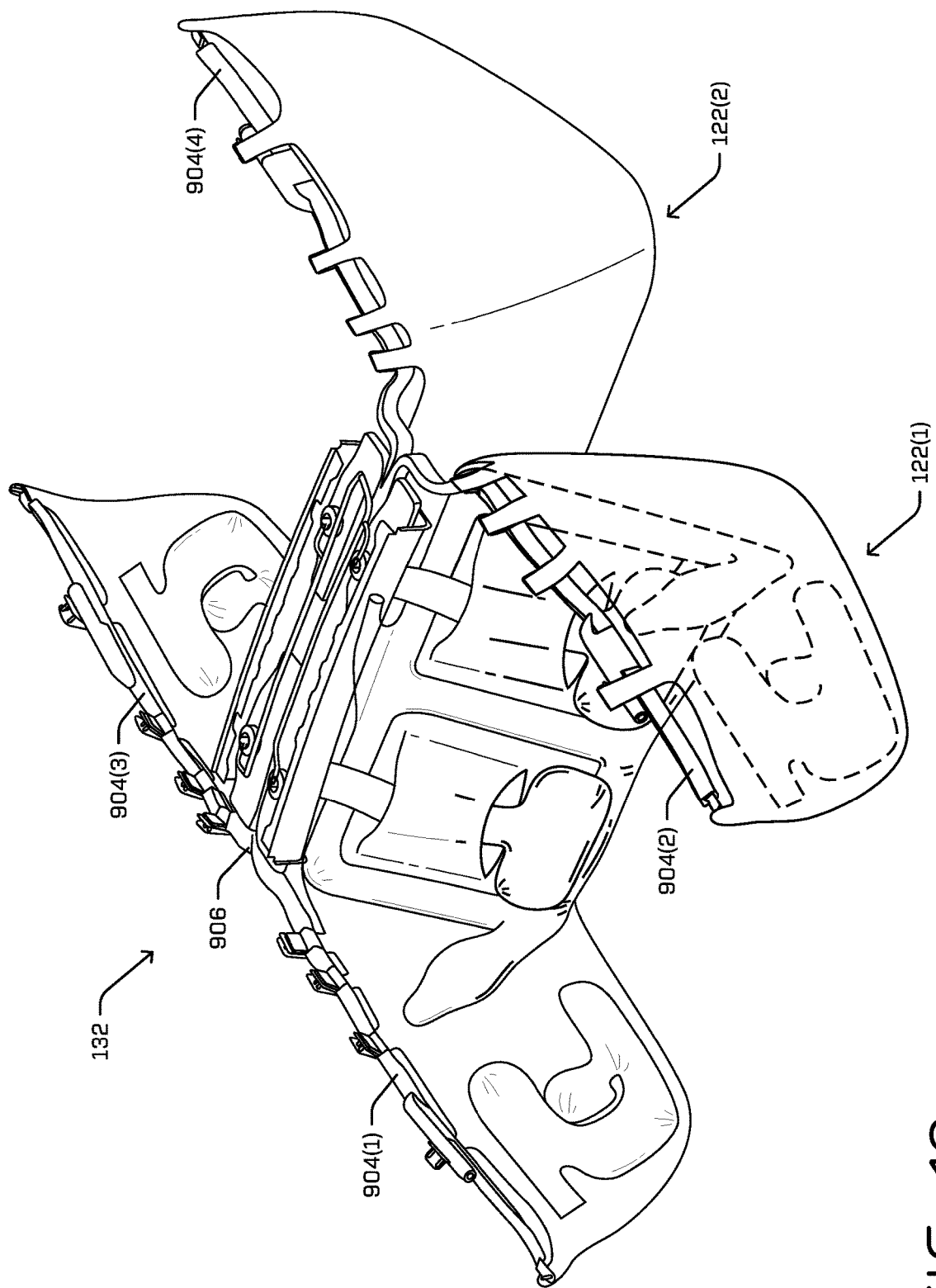
FIG. 10 illustrates a perspective view showing the expandable curtain of FIG. 2 coupled to the framework of FIG. 9, according to an example of the present disclosure.

FIG. 10 illustrates a coupling of expandable curtains to the framework 132. For example, as introduced above in FIG. 9, a first expandable curtain 122(1) may couple to the first member 904(1), the second member 904(2), and the one or more cross-members 906, within the first area 900. A second expandable curtain 122(2) may couple to the third member 904(3), the fourth member 904(4), and the one or more cross-members 906, within the second area 902. The first expandable curtain 122(1) and the second expandable curtain 122(2) may represent the expandable curtain 122 or the expandable curtain 800.

The first expandable curtain 122(1) and the second expandable curtain 122(2) are shown in the deployed state in FIG. 9. In the stowed state, however, the first expandable curtain 122(1) and the second expandable curtain 122(2) may be folded and/or rolled up into the vehicle roof 128. In the stowed state, the first expandable curtain 122(1) and the second expandable curtain 122(2) may couple to the first member 904(1), the second member 904(2), the third member 904(3), the fourth member 904(4), and/or the one or more cross-members 906, respectively, such that in the event of a collision, the first expandable curtain 122(1) and/or the second expandable curtain 122(2) drop down into the interior 104 and are attached at the attachment points 200.

Figure 11A:
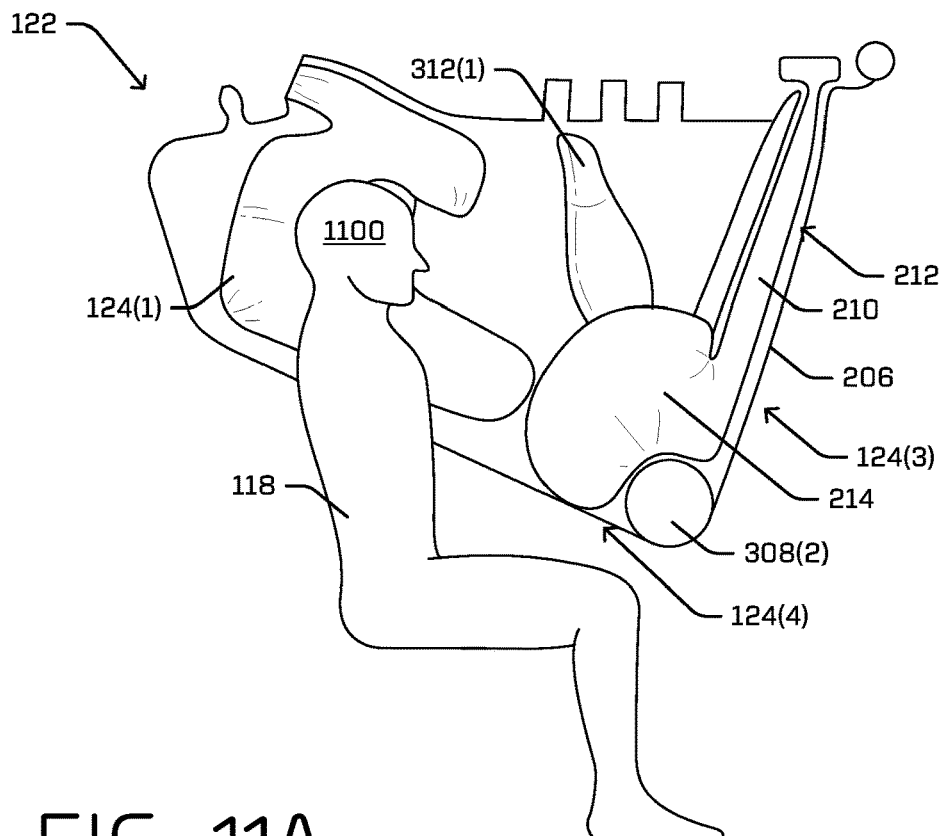
FIG. 11A illustrates an example occupant prior to contacting portions of the occupant protection system the vehicle of FIG. 1, according to an example of the present disclosure.
Figure 11B:
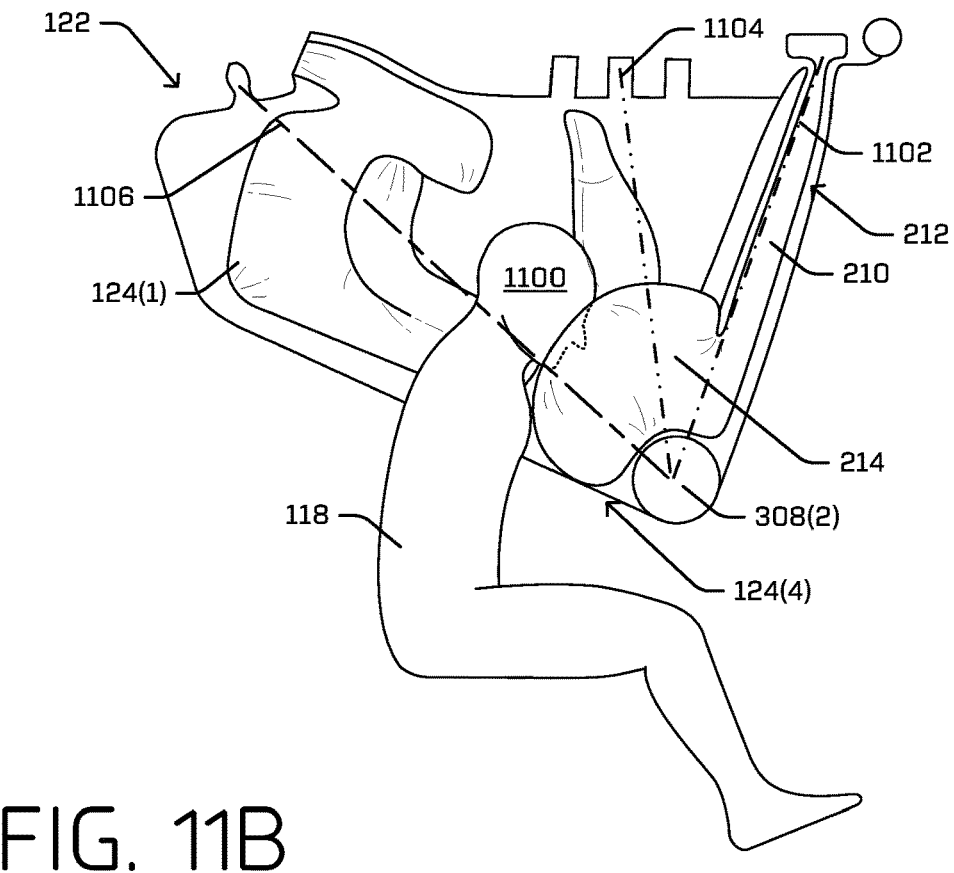
FIG. 11B illustrates an example vehicle occupant contacting portions of the occupant protection system the vehicle of FIG. 1, according to an example of the present disclosure.

FIGS. 11A and 11B are schematic sequence views of an occupant 118 during a collision involving the vehicle 100. The vehicle includes the occupant protection system 120 to protect the occupant 118 in the event of a collision.

FIG. 11A shows the expandable curtain 122 and some of the expandable bladders 124 in the deployed state with the occupant 118 still seated in the seat 116. In some instances, the deployment system 126 may receive one or more signals from the vehicle 100 indicative of a collision or a predicted collision involving the vehicle 100, and the deployment system 126 may activate one or more inflator(s) 130 to deploy the expandable curtain 122 and/or the expandable bladders 124. In some examples, only expandable bladders 124 associated with seats 116 in which occupants 118 have been detected, or are seated, can be deployed. For example, only expandable bladders 124 in front of and close enough to the occupied seats that would be effective in arresting movement of the respective occupants during a collision may be deployed.

The occupant protection system 120 includes the expandable curtain 122 that can have the front section 206 suspended from the vehicle roof 128, with the third expandable bladder 124(3), and the fourth expandable bladder 124(4) suspended from the vehicle roof 128. The third expandable bladder 124(3) of the expandable curtain 122 can include the second horizontally-extending portion 308(2) as well the first diagonally-extending portion 312(1). As illustrated, the first neck portion 210 of the fourth expandable bladder 124(4) can be at least partially disposed within (e.g., routes through) the first passage 212 of the expandable curtain 122 (e.g., between two surfaces of the expandable curtain 122). Additionally, or alternatively, the first neck portion 210 may route external to the expandable curtain 122 (e.g., behind layers of the expandable curtain). The first head portion 214 of the third expandable bladder 124(3) can be disposed external to the first passage 212. A portion of the first head portion 214 can rest on, or abut the second horizontally-extending portion 308(2). As also shown, the first expandable bladder 124(1) may be deployed adjacent to a side of the occupant 118.

In some instances, the first expandable bladder 124(1), the second expandable bladder 124(2), and the expandable curtain 122 may be deployed together, concurrently or substantially simultaneously, or may be deployed independently of one another. For example, the deployment system 126 may be configured to cause the first expandable bladder 124(1), the second expandable bladder 124(2), and the expandable curtain 122 to deploy and/or expand from the stowed state to the deployed state at a first time. Thereafter the deployment system 126 may cause the fourth expandable bladder 124(4) (and/or the fifth expandable bladder 124(5)) to expand from the stowed state to the deployed state at a second time following the first time. In some examples, the fourth expandable bladder 124(4) and the fifth expandable bladder 124(5) may be deployed individually.

FIG. 11B shows the occupant 118 being propelled forward in the vehicle 100 during a collision. In the example shown, a head 1100 of the occupant 118 and a torso of the occupant 118 are propelled forward into the fourth expandable bladder 124(4), supported by the expandable curtain 122, arrests the forward movement of the occupant 118 in a cushioned manner to reduce the likelihood of injury. More particularly, the head 1100 of the occupant 118 contacts the first head portion 214 of the fourth expandable bladder 124(4). The third expandable bladder 124(3) may assist in cushioning the forward movement of the occupant 118, as well as providing a support for the fourth expandable bladder 124(4).

Also illustrated, the routing of the first neck portion 210 through the first passage 212 may position the first head portion 214 in front of the occupant 118, as well as preventing the first head portion 214 from repositioning during contact by the head 1100 of the occupant 118. In this manner, the first neck portion 210 secures the fourth expandable bladder 124(4) to the expandable curtain 122 and prevents the first head portion 214 repositioning (e.g., laterally) when the head 1100 contacts the first head portion 214. This provides better control to the relative movement of the expandable curtain 122 and the expandable bladders 124 to improve safety. The first head portion 214 can be located closer to occupant 118, as compared to the first neck portion 210. The first neck portion 210 may include a lesser volume than the first head portion 214 to increase a rate and which the first head portion 214 is inflated. That is, the first head portion 214 may extend a from proximate the expandable curtain 122 in a direction towards the occupant 118.

The fourth expandable bladder 124(4) may include a vent that releases pressure within the fourth expandable bladder 124(4) reaching a certain internal pressure threshold. For example, during the collision, as the head 1100 contacts the first head portion 214, pressure within the fourth expandable bladder 124(4) may be released. Releasing the pressure within the fourth expandable bladder 124(4) may prevent the head 1100 of the occupant 118 snapping back or bouncing off the first head portion 214. In some instances, the first expandable bladder 124(1), the second expandable bladder 124(2), and/or the fourth expandable bladder 124(4) may not include vents or pressure releases.

The expandable curtain 122 couples to the framework 132 (or more generally, the body 102 and/or the vehicle roof 128). This coupling supports the expandable bladders 124 when the occupant 118 contacts the fourth expandable bladder 124(4) (e.g., the first head portion 214) as the occupant 118 is urged forward in the direction toward. For example, being as the first side section 202 can be coupled to the framework 132, as the occupant 118 contacts the first head portion 214, the expandable curtain 122 may be prevented from swinging freely. That is, the expandable curtain 122 can be tethered to the vehicle 100 to resist movement during the collision and from contact by the occupant 118. This tethering may create a first tether line 1102, a second tether line 1104, and a third tether line 1106. The tether lines 1102-1106 represent lines or axes along which tension occurs as the head 1100 of the occupant 118 contacts the first head portion 214 (other expandable bladders 124 and/or the expandable curtain 122) to prevent the expandable curtain 122 from swinging in the event of a collision.

Although the discussion is with regard to the fourth expandable bladder 124(4), the fifth expandable bladder 124(5) may function and deploy in a similar manner.

Figure 12:
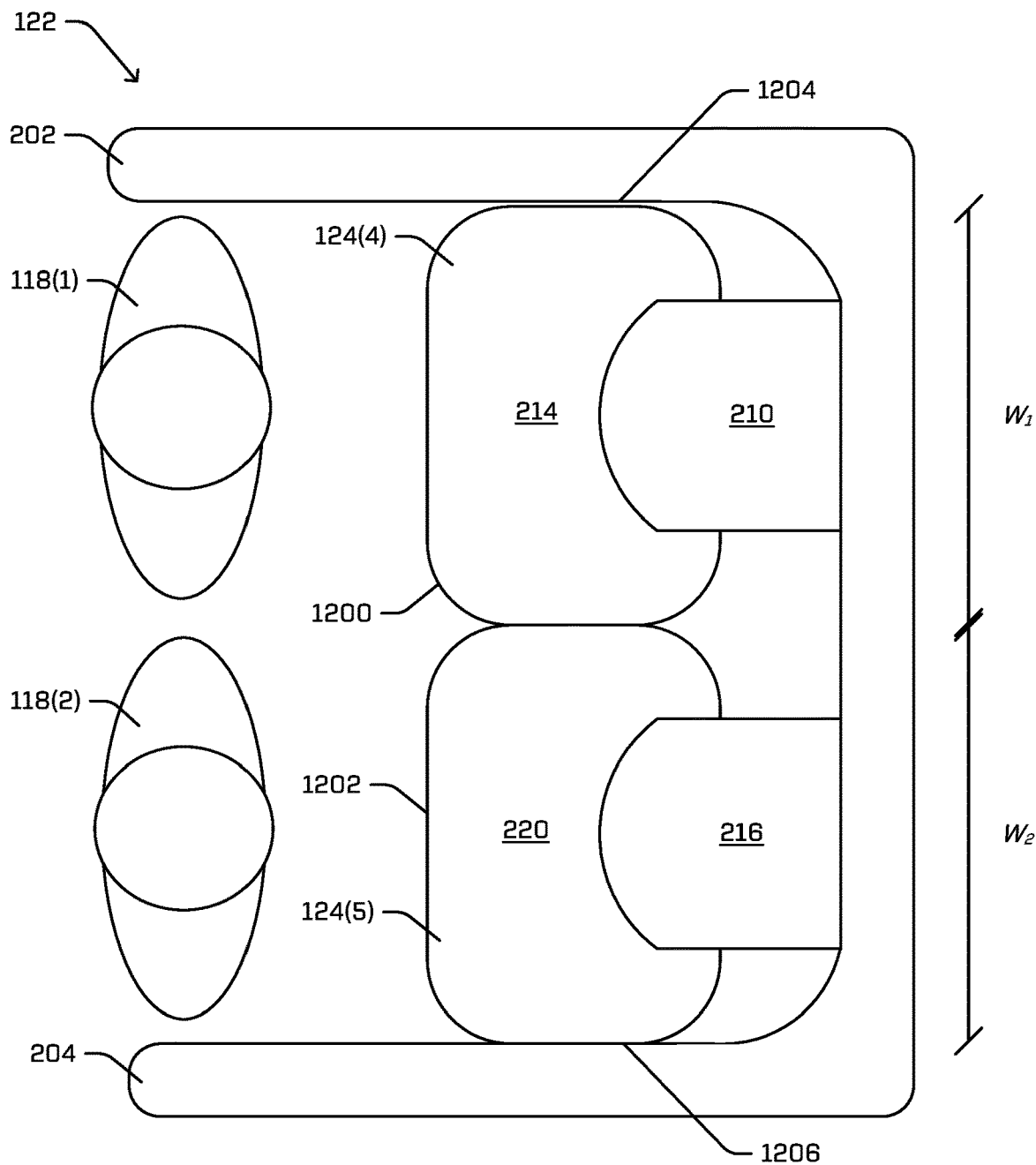
FIG. 12 illustrates a top view of an example expandable curtain and one or more example expandable bladders, accordingly to an example of the present disclosure.

FIG. 12 illustrates a top view of the expandable curtain 122 and the expandable bladders 124 in the deployed state. When deployed, the fourth expandable bladder 124(4) and the fifth expandable bladder 124(5) may be restricted, or substantially redistricted, from moving laterally within the interior 104. This restriction may prevent the fourth expandable bladder 124(4) and the fifth expandable bladder 124(5) from repositioning and shifting away from the first occupant 118(1) and the second occupant 118(2). For example, in the event of a collision, and as the first occupant 118(1) contacts the first head portion 214, the first head portion 214 may have a tendency to move laterally (e.g., side to side). However, the fourth expandable bladder 124(4), and particularly the first head portion 214, may have a width $w_1$ and the fifth expandable bladder 124(5), and similarly the second head portion 220, may have a width $w_2$ that substantially fill a distance between the first side section 202 and the second side section 204.

In other words, when the fourth expandable bladder 124(4) and the fifth expandable bladder 124(5) are inflated (as well as the other expandable bladders 124), a first exterior surface 1200 of the fourth expandable bladder 124(4) may contact a first interior side 1204 of the first side section 202, as well as a second exterior surface 1202 of the fifth expandable bladder 124(5). The fifth expandable bladder 124(5) may contact a second interior side 1206 of the second side section 204, as well as the first exterior surface 1200 of the fourth expandable bladder 124(4). This abutment may prevent the fourth expandable bladder 124(4) and the fifth expandable bladder 124(5) from shifting or cavitating in the event of a collision and contact by the occupant to the fourth expandable bladder 124(4) (as shown in FIG. 11B).

Although FIG. 12 illustrates the first head portion 214 and the second head portion 220 being inflated, in some instances, the first head portion 214 and/or the second head portion 220 may be inflated based on detecting the first occupant 118(1) and the second occupant 118(2) being seated. That is, if the second occupant 118(2) is not present, the fifth expandable bladder 124(5) may not be inflated.

Figure 13:
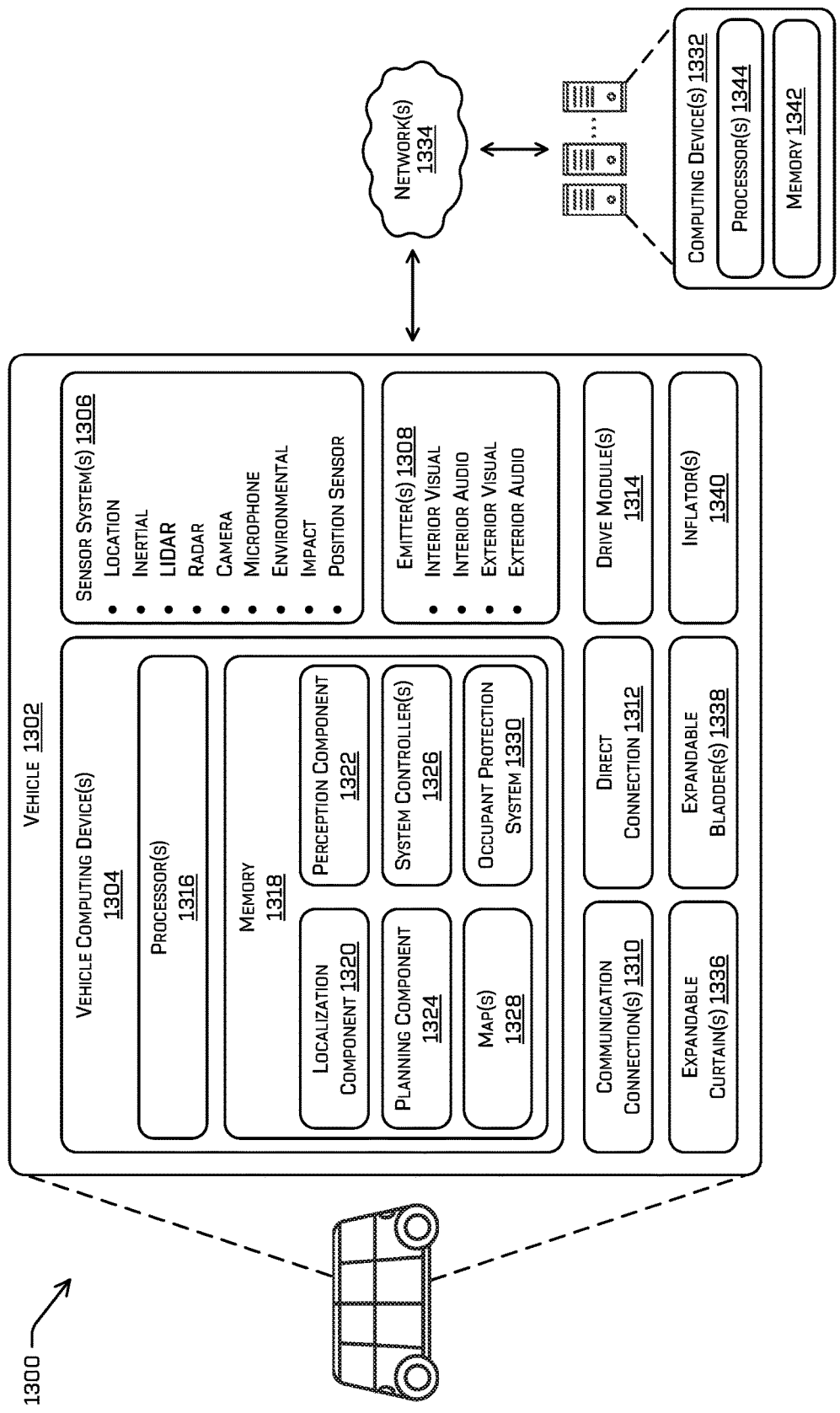
FIG. 13 illustrates a diagram showing an example architecture for vehicle systems including an example occupant protection system, according to an example of the present disclosure.

FIG. 13 is a block diagram of an example system 1300 for implementing the example techniques described herein. In at least some examples, the system 1300 may include a vehicle 1302, which may correspond to the example vehicle 100 shown in FIG. 1. The vehicle 1302 may include vehicle computing device(s) 1304, one or more sensor system(s) 1306, one or more emitter(s) 1308, one or more communication connection(s) 1310, at least one direct connection 1312, and one or more drive module(s) 1314.

The vehicle computing device(s) 1304 may include one or more processor(s) 1316 and memory 1318 communicatively coupled with the one or more processor(s) 1316. In the illustrated example, the vehicle 1302 is an autonomous vehicle. However, the vehicle 1302 may be any other type of vehicle. In the illustrated example, the memory 1318 of the vehicle computing device(s) 1304 stores a localization component 1320, a perception component 1322, a planning component 1324, one or more system controller(s) 1326, one or more map(s) 1328, and an occupant protection system 1330. Though depicted in FIG. 11 as residing in memory 1318 for illustrative purposes, it is contemplated that the localization component 1320, the perception component 1322, the planning component 1324, the one or more system controller(s) 1326, the one or more map(s) 1328, and the occupant protection system 1330 may additionally, or alternatively, be accessible to the vehicle 1302 (e.g., stored on, or otherwise accessible by, memory remote from the vehicle 1302).

In some examples, the one or more of sensor system(s) 1306, the localization component 1320, the perception component 1322, or the planning component 1324 may generate one or more triggering signals due to a predicted collision or actual collision involving the vehicle 1302. For example, one or more of the sensor system(s) 1306 may generate one or more signals indicative of an object (e.g., another vehicle, a wall, a guardrail, a bridge support, a utility pole, and/or a pedestrian) and communicate the one or more signals to the perception component 1322 and/or the planning component 1324, which may predict a collision with an object in the environment through which the vehicle 1302 is travelling.

The localization component 1320 may be configured to receive data from the sensor system(s) 1306 to determine a position and/or orientation of the vehicle 1302 (e.g., one or more of an x-, y-, z-position, roll, pitch, or yaw). For example, the localization component 1320 may include and/or request/receive a map of an environment and may continuously determine a location and/or orientation of the vehicle 1302 within the map. In some examples, the localization component 1320 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the vehicle 1302. In some examples, the localization component 1320 may provide data to various components of the vehicle 1302 to determine an initial position of the vehicle 1302 for generating a candidate trajectory, as discussed herein.

In some examples, the perception component 1322 may be configured to perform object detection, segmentation, and/or classification. In some examples, the perception component 1322 may provide processed sensor data that indicates a presence of an entity that is proximate to the vehicle 1302 and/or a classification of the entity as an entity type (e.g., car, pedestrian, cyclist, animal, building, tree, road surface, curb, sidewalk, unknown, etc.). In additional and/or alternative examples, the perception component 1322 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 1324 may determine a path for the vehicle 1302 to follow to traverse through an environment. For example, the planning component 1324 may determine various routes and trajectories and various levels of detail. For example, the planning component 1324 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 1324 may generate an instruction for guiding the vehicle 1302 along at least a portion of the route from the first location to the second location. In at least one example, the planning component 1324 may determine how to guide the vehicle 1302 from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 1302 to navigate.

In at least one example, the planning component 1324 may determine a location of a user based on image data of an environment received from the user using, for example, bags of binary words with image-based features, artificial neural network, and the like. Further, the planning component 1324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 1302 may stop to pick up a passenger. In at least one example, the planning component 1324 may determine a pickup location based at least in part on determining a user identity (e.g., determined via image recognition or received as an indication from a user device, as discussed herein).

The vehicle computing device(s) 1304 also includes the system controller(s) 1326, which may be configured to control steering, propulsion, braking, safety, emitters, communication, and other systems of the vehicle 1302. These system controller(s) 1326 may communicate with and/or control corresponding systems of the drive module(s) 1314 and/or other components of the vehicle 1302.

The map(s) 1328 may be used by the vehicle 1302 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like).

In one example, the map 1328 may include a three-dimensional mesh of the environment. In some examples, the map 1328 may be stored in a tiled format, such that individual tiles of the map represent a discrete portion of an environment and may be loaded into working memory as needed. In at least one example, the map(s) 1328 may include at least one map (e.g., images and/or a mesh). In some examples, the vehicle 1302 may be controlled based at least in part on the map(s) 1328. That is, the map(s) 1328 may be used in connection with the localization component 1320, the perception component 1322, and/or the planning component 1324 to determine a location of the vehicle 1302, identify objects in an environment, and/or generate routes and/or trajectories to navigate within an environment.

In some examples, the map(s) 1328 may be stored on a remote computing device(s) (such as computing device(s) 1332) accessible via one or more network(s) 1334. In some examples, multiple maps 1328 may be stored based on, for example, a characteristic (e.g., type of entity, time of day, day of week, season of the year, etc.). Storing multiple maps 1328 may have similar memory requirements but increase the speed at which data in a map may be accessed.

The occupant protection system 1330 may be the same as the occupant protection system 1330 detailed above. For instance, and without limitation, the occupant protection system 1330 may include functionality to determine a collision event, determine the presence of occupant(s) in the vehicle 1302, and/or determine a direction of travel of the vehicle 1302. Based at least in part on any of this information, all of this information, and/or any other information, the occupant protection system 1330 may cause one or more expandable curtain(s) 1336 and/or one or more expandable bladders 1338 to transition from a stowed state to a deployed state. For example, the occupant protection system 1330 may instruct inflator(s) 1340 to inflate the expandable bladders 1338, respectively. Other functionality of the occupant protection system 1330 is envisioned.

As an example, occupant protection system 1330 may receive one or more signals indicative of the presence of an occupant 118 in a first location of the vehicle 1302 associated with (e.g., within an effective range of) one of the expandable bladders 1338, and cause deployment of the corresponding expandable bladder 1338 associated with the position of the occupant 118 based at least in part on the one or more signals. In some instances, the occupant protection system 1330 may leverage one or more of the sensor system(s) 1306 and determine information about the occupant 118, such as, for example, the size and/or weight of the occupant 118 (e.g., whether the occupant 118 is an adult, a child, or an infant). If no occupant 118 is present, the deployment system may receive one or more signals associated with whether the occupant 118 is in the seat. This may prevent unnecessary deployment and prevent costs associated with servicing deployed parts of the occupant protection system 1330.

In some instances, deployment of the expandable curtain 1336 and/or one or more of the expandable bladders 1338 may be affected by a number of parameters. For example, the deployment rate, the deployment volume (or pressure), the timing of deployment, and/or the sequence of deployment of one or more of the expandable curtain 1336 or the expandable bladders 1338 may be altered based at least in part on one or more parameters, such as, for example, the severity of a collision impact, whether one or more occupants 118 is/are properly wearing a seatbelt, and/or the size and/or weight of the occupant(s) 118 (e.g., depending on whether the occupant is an adult, a child, or an infant).

In some examples, aspects of some or all of the components discussed herein may include any models, algorithms, and/or machine learning algorithms. For example, in some examples, the components in the memory 1318 and/or the memory 1342 may be implemented as a neural network. As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 1306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. Without limitation, the sensor system(s) 1306 can include the sensor system(s) 1306 discussed above. The sensor system(s) 1306 may include multiple examples of each of these or other types of sensors. For example, the LIDAR sensors may include individual LIDAR sensors located at the corners, front, back, sides, and/or top of the vehicle 1302. As another example, the camera sensors may include multiple cameras disposed at various locations about the exterior and/or interior of the vehicle 1302. The sensor system(s) 1306 may provide input to the vehicle computing device(s) 1304. Additionally, or alternatively, the sensor system(s) 1306 may send sensor data, via the one or more networks 1334, to the one or more computing device(s) 1332 at a particular frequency, after a lapse of a predetermined period of time, in near real-time, etc.

The emitter(s) 1308 may be configured to emit light and/or sound. The emitter(s) 1308 in this example include interior audio and visual emitters to communicate with passengers of the vehicle 1302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The communication connection(s) 1310 enable communication between the vehicle 1302 and one or more other local or remote computing device(s). For example, the communication connection(s) 1310 may facilitate communication with other local computing device(s) on the vehicle 1302 and/or the drive module(s) 1314. Also, the communication connection(s) 1310 may allow the vehicle 1302 to communicate with other nearby computing device(s) (e.g., other nearby vehicles, traffic signals, etc.). The communication connection(s) 1310 also enable the vehicle 1302 to communicate with a remote teleoperations computing device or other remote services.

The communication connection(s) 1310 may include physical and/or logical interfaces for connecting the vehicle computing device(s) 1304 to another computing device or a network, such as network(s) 1334. For example, the communication connection(s) 1310 may enable Wi-Fi-based communication, such as via frequencies defined by the IEEE 802.11 standards, short range wireless frequencies such as Bluetooth®, cellular communication (e.g., 2G, 3G, 4G, 4G LTE, 6G, etc.) or any suitable wired or wireless communications protocol that enables the respective computing device to interface with the other computing device(s).

In at least one example, the direct connection 1312 may provide a physical interface to couple the one or more drive module(s) 1314 with the body of the vehicle 1302. For example, the direct connection 1312 may allow the transfer of energy, fluids, air, data, etc. between the drive module(s) 1314 and the vehicle 1302. In some examples, the direct connection 1312 may further releasably secure the drive module(s) 1314 to the body of the vehicle 1302.

In at least one example, the vehicle 1302 may include the drive module(s) 1314. In some examples, the vehicle 1302 may have a single drive module 1314. In at least one example, if the vehicle 1302 has multiple drive modules 1314, individual drive modules 1314 may be positioned on opposite ends of the vehicle 1302 (e.g., the leading end and the rear end, etc.). In at least one example, the drive module(s) 1314 may include one or more sensor systems to detect conditions of the drive module(s) 1314 and/or the surroundings of the vehicle 1302. By way of example and not limitation, the sensor system(s) 1306 may include one or more wheel encoders (e.g., rotary encoders) to sense rotation of the wheels of the drive module(s) 1314, inertial sensors (e.g., inertial measurement units, accelerometers, gyroscopes, magnetometers, etc.) to measure orientation and acceleration of the drive module(s) 1314, cameras or other image sensors, ultrasonic sensors to acoustically detect objects in the surroundings of the drive module(s) 1314, LIDAR sensors, radar sensors, etc. Some sensors, such as the wheel encoders may be unique to the drive module(s) 1314. In some cases, the sensor system(s) on the drive module(s) 1314 may overlap or supplement corresponding systems of the vehicle 1302 (e.g., sensor system(s) 1306).

The drive module(s) 1314 may include many of the vehicle systems, including a high voltage battery, a motor to propel the vehicle 1302, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle 1302), and one or more other systems (e.g., cooling system, safety systems, onboard charging system, other electrical components such as a DC/DC converter, a high voltage junction, a high voltage cable, charging system, charge port, etc.). Additionally, the drive module(s) 1314 may include a drive module controller, which may receive and preprocess data from the sensor system(s) 1306 and to control operation of the various vehicle systems. In some examples, the drive module controller may include one or more processors and memory communicatively coupled with the one or more processors. The memory may store one or more modules to perform various functionalities of the drive module(s) 1314. Furthermore, the drive module(s) 1314 also include one or more communication connection(s) that enable communication by the respective drive module with one or more other local or remote computing device(s).

In at least one example, the localization component 1320, the perception component 1322, the planning component 1324, and/or the occupant protection system 1330 may process sensor data, as described above, and may send their respective outputs, over the one or more network(s) 1334, to one or more computing device(s) 1332. In at least one example, the localization component 1320, the perception component 1322, the planning component 1324, and/or the occupant protection system 1330 may send their respective outputs to the one or more computing device(s) 1332 at a particular frequency, after a lapse of a predetermined period of time, in near real-time, etc.

The processor(s) 1316 of the vehicle 1302 and/or the processor(s) 1344 of the computing device(s) 1332 may include any suitable processor capable of executing instructions to process data and perform operations as described herein. By way of example and not limitation, the processor(s) 1316, 1344 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 1318 and 1342 are examples of non-transitory computer-readable media. The memory 1318 and 1342 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 13 is illustrated as a distributed system, in alternative examples, components of the vehicle 1302 may be associated with the computing device(s) 1332, and/or components of the computing device(s) 1332 may be associated with the vehicle 1302. That is, the vehicle 1302 may perform one or more of the functions associated with the computing device(s) 1332 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example system 1300 shown in FIG. 11 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 1300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the system 1300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the system 1300 may be transmitted to the system 1300 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

Figure 14:
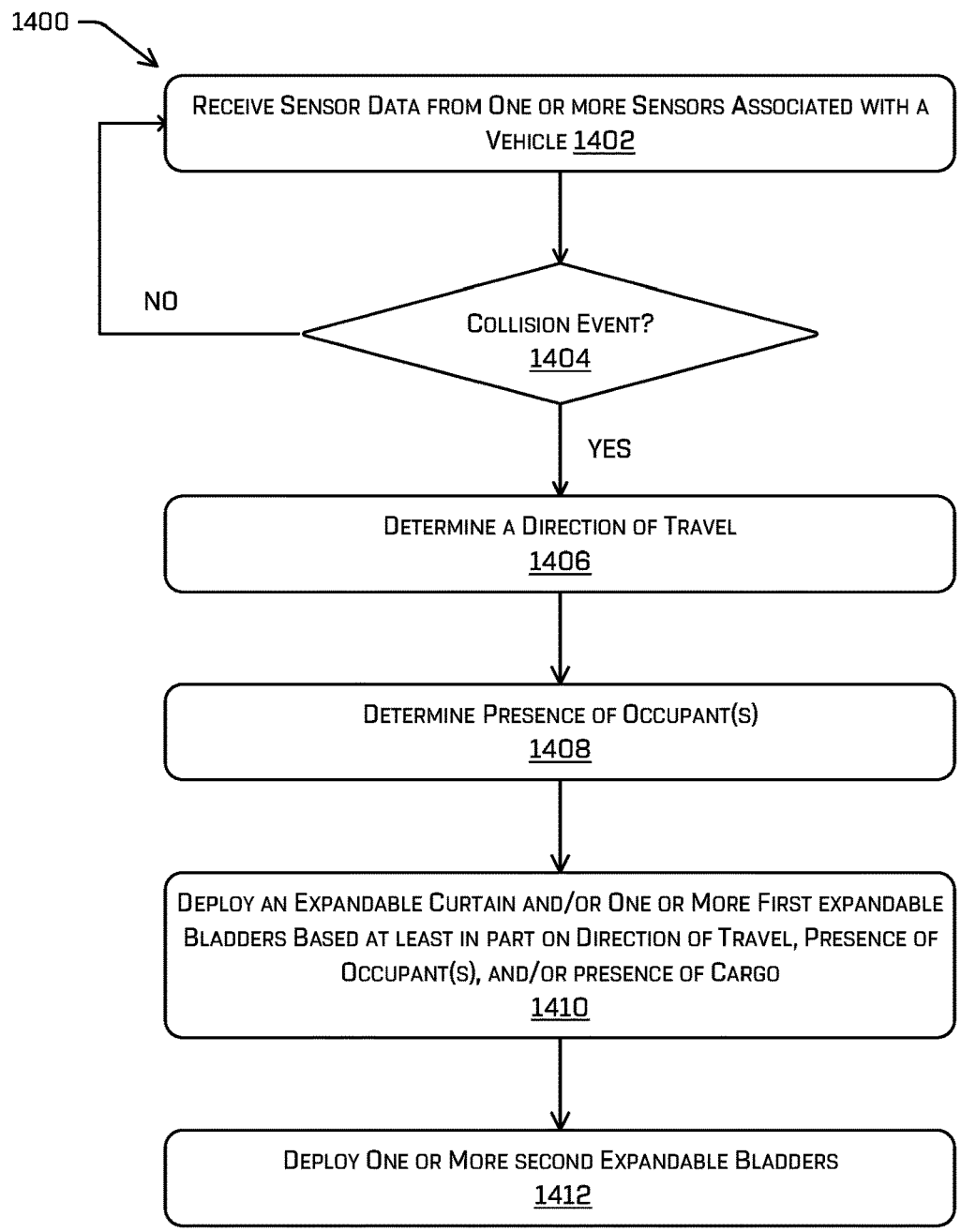
FIG. 14 illustrates an example process for deploying an occupant protection system, according to an example of the present disclosure.

FIG. 14 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

More specifically, FIG. 14 is a flow diagram of an example process 1400 for deploying an expandable occupant protection system. At an operation 1402, the process 1400 includes receiving sensor data from one or more sensors associated with a vehicle. For example, the sensors can include the sensor system(s) 1306, the occupant sensors 142, and/or any other sensors that generate sensor data associated with a vehicle. Without limitation, the sensors from which data is received at the operation 1402 can include location sensors, position sensors, proximity sensors, inertial sensors, LIDAR sensors, camera sensors, microphone sensors, environmental sensors, impact sensors, and/or other sensor modalities.

At an operation 1404, the process 1400 includes determining whether a collision event exists. For example, the operation 1404 may include determining, based at least in part on the sensor data received at 1402 that the vehicle 100 has been involved in a collision, or that a collision is imminent. As stated above, vehicle 100 may utilize sensor data such a LIDAR information to determine the surroundings of the environment around the vehicle 100. Such surroundings may contain obstacles, objects, people, other vehicles, among other things. The systems may receive the sensor information and make a determination, with prediction algorithms, such as machine learning models, and determine that there will be a collision of an imminent collision involving the vehicle 100.

If, at the operation 1404 it is determined that the there is a collision event, the process 1400 may follow the "YES" route and proceed to 1406. Otherwise, the process 1400 may loop to 1402, following the "NO" route from 1404. At an operation 1406 of the process 1400 includes determining a direction of travel of the vehicle. As stated above, the vehicle 100 may move in a bidirectional manner. As such, any seat, depending on the direction of travel, may be forward- or rear-facing. For example, the operation 1404 may be carried out by the direction detection component 138 discussed above.

At an operation 1408, the process 1400 includes determining a presence of one or more occupants. For example, as discussed above, the seats 116 of the vehicle 100 may include the associated occupant sensors 142. The occupant sensors 142 generate data that may be received at the operation 1402, and the operation 1408 includes using the data to determine whether and which of the seats 116 are occupied. For example, the operation 1406 may be carried out the presence detection component 136 discussed above.

At an operation 1410, the process 1400 includes deploying an expandable curtain and/or one or more first expandable bladders based at least in part on the direction of travel and/or the presence of the occupant(s). In some instances, the operation 1410 may include causing the expandable curtain 122 to be deployed, as well as the first expandable bladder 124(1), the second expandable bladder 124(2), and/or third expandable bladder 124(3). Here, the first expandable bladder 124(1), the second expandable bladder 124(2), and/or third expandable bladder 124(3) may be considered the first expandable bladders. Deploying the expandable curtain 122 as well as the one or more first expandable bladders includes causing the expandable curtain 122 to expand from a stowed state to a deployed state extending substantially across an interior of the vehicle 100 between a first interior side and a second interior side, for example, based on one or more of the signal types described with respect to operation 1402. In some examples, at 1410, the process 1400 may include causing, at a first time, the expandable curtain 122 and the one or more first expandable bladders to expand from a stowed state to a deployed state.

At an operation 1412, the process 1400 includes deploying one or more second expandable bladders. In some instances, the operation 1412 may include causing the fourth expandable bladder 124(4) and the fifth expandable bladder 124(5) to be deployed. Here, the fourth expandable bladder 124(4) and/or the fourth expandable bladder 124(4) may be considered the second expandable bladders.

Deploying the one or more second expandable bladders includes causing the second expandable bladders to expand in a direction towards occupants 118 of the vehicle 100. In some examples, at 1412, the process 1400 may include causing, at a second time, the one or more second expandable bladders to expand from a stowed state to a deployed state. The second time may be after the first time, but may at least partially overlap with the first time. In other words, the deployment system 126 may be configured to first deploy the expandable curtain 122 and the one or more first expandable bladders, and once that has begun, thereafter deploy the one or more second expandable bladder(s). In doing so, the expandable curtain 122 may provide a support for the one or more second expandable bladder(s). In some instances, the one or more second expandable bladders may be deployed within a certain period of time after deploying the expandable curtain 122 and the one or more first expandable bladders (e.g., 1 millisecond, 2 milliseconds, 5 milliseconds, etc.).

EXAMPLE CLAUSES

The following paragraphs describe various examples. Any of the examples in this section may be used with any other of the examples in this section and/or any of the other examples or embodiments described herein.

A: An occupant protection system for a vehicle, the vehicle including a first seat next to a second seat, the occupant protection system comprising: an expandable curtain configured to expand from a stowed state to a deployed state, the expandable curtain including: a first side configured to extend along a portion of a first interior side of the vehicle, the first side having a first expandable portion expandable proximate the first interior side and the first seat, a second side configured to extend along a portion of a second interior side of the vehicle, the second side having a second expandable portion expandable proximate the second interior side and the second seat, and a front section extending between the first side and the second side, the front section having a third expandable portion, that in the deployed state, faces the first seat and the second seat, the front section further defining a first sleeve and a second sleeve; a first front expandable bladder at least partially received within the first sleeve, the first front expandable bladder, in an expanded state, at least partially facing the first seat; and a second front expandable bladder at least partially received within the second sleeve, the second front expandable bladder, in an expanded state, at least partially facing the second seat.

B: The occupant protection system of paragraph A, wherein: the first front expandable bladder includes: a first neck portion at least partially received within the first sleeve, and a first head portion residing external to the first sleeve; and the second front expandable bladder includes: a second neck portion at least partially received within the second sleeve, and a second head portion residing external to the second sleeve.

C: The occupant protection system of paragraph A or B, further comprising: a first inflator configured to inflate the first expandable portion; a second inflator configured to inflate the second expandable portion; a third inflator configured to inflate the third expandable portion; a fourth inflator configured to inflate the first front expandable bladder at least partially after inflation of the first expandable portion, the second expandable portion, and the third expandable portion; and a fifth inflator configured to inflate the second front expandable bladder at least partially after inflation of the first expandable portion, the second expandable portion, and the third expandable portion.

D: The occupant protection system of any of paragraphs A-C, wherein: the expandable curtain further includes: a top, and a bottom opposite the top; the third expandable portion includes: a first horizontally-extending portion disposed more proximate the top than the bottom, a second horizontally-extending portion disposed more proximate the bottom than the top, a first vertically-extending portion disposed more proximate the first side than the second side, a second vertically-extending portion, a third vertically-extending portion disposed more proximate the second side than the first side, a first diagonally-extending portion extending from a first intersection of the second horizontally-extending portion and the first vertically-extending portion, and a second diagonally-extending portion extending from a second intersection of the second horizontally-extending portion and the third vertically-extending portion; the first sleeve is disposed interior to the first horizontally-extending portion, the second horizontally-extending portion, the first vertically-extending portion, and the second vertically-extending portion; and the second sleeve is disposed interior to the first horizontally-extending portion, the second horizontally-extending portion, the second vertically-extending portion, and the third vertically-extending portion.

E: An occupant protection system, comprising: an expandable curtain configured to expand from a stowed state to a deployed state, the expandable curtain including: a first side section, a second side section, and a front section disposed between the first side section and the second side section; an expandable bladder mechanically coupled to the expandable curtain, the expandable bladder including: a neck portion, and a head portion extending from the neck portion; and an inflator configured to inflate the expandable bladder.

F: The occupant protection system of paragraph E, wherein the expandable curtain is formed from a one piece woven.

G: The occupant protection system of paragraph E or F, wherein: the front section defines a passage; the neck portion is at least partially received within the passage to indirectly couple the expandable bladder to the expandable curtain; and the head portion resides external to the passage.

H: The occupant protection system of any of paragraphs E-G, wherein the neck portion is at least one of adhered to or formed within the expandable curtain to directly couple the expandable bladder to the expandable curtain.

I: The occupant protection system of any of paragraphs E-H, wherein the first side section has a second expandable bladder, the second side section has a third expandable bladder, and the front section has a fourth expandable bladder, further comprising: a fifth expandable bladder mechanically coupled to the expandable curtain, the fifth expandable bladder including: a second neck portion, and a second head portion extending from the second neck portion; and a second inflator configured to inflate the fifth expandable bladder.

J: The occupant protection system of any of paragraphs E-I, further comprising: a third inflator configured to inflate the second expandable bladder; a fourth inflator configured to inflate the third expandable bladder; and a fifth inflator configured to inflate the fourth expandable bladder.

K: The occupant protection system of any of paragraphs E-J, wherein: the expandable bladder, the second expandable bladder, the third expandable bladder, the fourth expandable bladder, and the fifth expandable bladder are configured to be inflated from a deflated configuration to an inflated configuration; the second expandable bladder, the third expandable bladder, and the fourth expandable bladder are configured to be inflated from the deflated configuration to the inflated configuration at a first instance in time; and at least one of the expandable bladder or the fifth expandable bladder is configured to be inflated from the deflated configuration to the inflated configuration, at a second instance in time that is after the first instance in time, but which at least partially overlaps with the first instance in time.

L: The occupant protection system of any of paragraphs E-K, wherein the front section has a second expandable bladder, the second expandable bladder including: a first horizontally-extending portion; a second horizontally-extending portion; a first vertically-extending portion; a second vertically-extending portion; a third vertically-extending portion; a first diagonally-extending portion extending from a first intersection of the second horizontally-extending portion and the first vertically-extending portion; and a second diagonally-extending portion extending from a second intersection of the second horizontally-extending portion and the third vertically-extending portion.

M: The occupant protection system of any of paragraphs E-L, wherein: at least a portion of the first diagonally-extending portion is disposed on the first side section; and at least a portion of the second diagonally-extending portion is disposed on the second side section.

N: The occupant protection system of any of paragraphs E-M, wherein: the expandable curtain includes a length that extends at least a portion of a distance between a vehicle roof and a vehicle floor; and a top of the expandable curtain is configured to a couple to a framework disposed in the vehicle roof.

O: A vehicle, comprising: an expandable curtain disposed in a roof of the vehicle, the expandable curtain being configured to selectively deploy from a stowed configuration to a deployed configuration; and an expandable bladder that is configured to inflate at least partially during deployment of the expandable curtain, the expandable bladder including: a neck portion mechanically coupled to the expandable curtain, and a head portion extending from the neck portion.

P: The vehicle of paragraph O, further comprising: a second expandable bladder that is configured to inflate at least partially during deployment of the expandable curtain, the second expandable bladder including: a second neck portion mechanically coupled to the expandable curtain, and a second head portion extending from the second neck portion; a first inflator fluidly connected to the expandable bladder and configured to inflate the expandable bladder; and a second inflator fluidly connected to the second expandable bladder and configured to inflate the second expandable bladder.

Q: The vehicle of paragraph O or P, wherein: the expandable curtain includes a first side section, a second side section, and a front section located between the first side section and the second side section; the first side section includes a second expandable bladder; the second side section includes a third expandable bladder; and the front section includes a fourth expandable bladder.

R: The vehicle of any of paragraphs O-Q, wherein at least part of the neck portion is at least one of adhered to, routed through, or formed within the expandable curtain.

S: The vehicle of any of paragraphs O-R, wherein the expandable curtain includes a second expandable bladder that is configured to inflate as the expandable curtain is deployed from the stowed configuration to the deployed configuration, the second expandable bladder including: a first horizontally-extending portion; a second horizontally-extending portion; a first vertically-extending portion; a second vertically-extending portion; a third vertically-extending portion; a first diagonally-extending portion extending from a first intersection of the second horizontally-extending portion and the first vertically-extending portion; and a second diagonally-extending portion extending from a second intersection of the second horizontally-extending portion and the third vertically-extending portion.

T: The vehicle of any of paragraphs O-S, wherein the neck portion couples to the expandable curtain interior to the first horizontally-extending portion, the second horizontally-extending portion, the first vertically-extending portion, and the second vertically-extending portion.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An occupant protection system for a vehicle, the vehicle including a first seat next to a second seat, the occupant protection system comprising:
    an expandable curtain configured to expand from a stowed state to a deployed state, the expandable curtain including:
        a first side configured to extend along a portion of a first interior side of the vehicle, the first side having a first expandable portion expandable proximate the first interior side and the first seat,
        a second side configured to extend along a portion of a second interior side of the vehicle, the second side having a second expandable portion expandable proximate the second interior side and the second seat, and
        a front section extending between the first side and the second side, the front section having a third expandable portion, that in the deployed state, faces the first seat and the second seat, the front section further defining a first sleeve and a second sleeve;
    a first front expandable bladder at least partially received within the first sleeve, the first front expandable bladder, in an expanded state, at least partially facing the first seat; and
    a second front expandable bladder at least partially received within the second sleeve, the second front expandable bladder, in an expanded state, at least partially facing the second seat.

2. The occupant protection system of claim 1, wherein:
    the first front expandable bladder includes:
        a first neck portion at least partially received within the first sleeve, and
        a first head portion residing external to the first sleeve; and
    the second front expandable bladder includes:
        a second neck portion at least partially received within the second sleeve, and
        a second head portion residing external to the second sleeve.

3. The occupant protection system of claim 1, further comprising:
    a first inflator configured to inflate the first expandable portion;
    a second inflator configured to inflate the second expandable portion;
    a third inflator configured to inflate the third expandable portion;
    a fourth inflator configured to inflate the first front expandable bladder at least partially after inflation of the first expandable portion, the second expandable portion, and the third expandable portion; and
    a fifth inflator configured to inflate the second front expandable bladder at least partially after inflation of the first expandable portion, the second expandable portion, and the third expandable portion.

4. The occupant protection system of claim 1, wherein:
    the expandable curtain further includes:
        a top, and
        a bottom opposite the top;
    the third expandable portion includes:
        a first horizontally-extending portion disposed more proximate the top than the bottom,
        a second horizontally-extending portion disposed more proximate the bottom than the top,
        a first vertically-extending portion disposed more proximate the first side than the second side,
        a second vertically-extending portion,
        a third vertically-extending portion disposed more proximate the second side than the first side,
        a first diagonally-extending portion extending from a first intersection of the second horizontally-extending portion and the first vertically-extending portion, and
        a second diagonally-extending portion extending from a second intersection of the second horizontally-extending portion and the third vertically-extending portion;
    the first sleeve is disposed interior to the first horizontally-extending portion, the second horizontally-extending portion, the first vertically-extending portion, and the second vertically-extending portion; and
    the second sleeve is disposed interior to the first horizontally-extending portion, the second horizontally-extending portion, the second vertically-extending portion, and the third vertically-extending portion.

5. An occupant protection system, comprising:
    an expandable curtain configured to expand from a stowed state to a deployed state, the expandable curtain including:
        a first side section,
        a second side section, and
        a front section disposed between the first side section and the second side section, the front section having a passage, wherein the front section extends transverse to the first side section and the second side section in the deployed state;
    an expandable bladder including:
        a neck portion at least partially routed through the passage to mechanically couple the expandable bladder to the expandable curtain, and
        a head portion extending from the neck portion and residing at least partially external to the passage; and
    an inflator configured to inflate the expandable bladder.

6. The occupant protection system of claim 5, wherein the expandable curtain is formed from a one piece woven material.

7. The occupant protection system of claim 5, wherein the neck portion is at least one of adhered to or formed within the expandable curtain.

8. The occupant protection system of claim 5, wherein the first side section has a second expandable bladder, the second side section has a third expandable bladder, and the front section has a fourth expandable bladder, further comprising:
    a fifth expandable bladder mechanically coupled to the expandable curtain, the fifth expandable bladder including:
        a second neck portion, and
        a second head portion extending from the second neck portion; and
    a second inflator configured to inflate the fifth expandable bladder.

9. The occupant protection system of claim 8, further comprising:
    a third inflator configured to inflate the second expandable bladder;
    a fourth inflator configured to inflate the third expandable bladder; and
    a fifth inflator configured to inflate the fourth expandable bladder.

10. The occupant protection system of claim 8, wherein:
the expandable bladder, the second expandable bladder, the third expandable bladder, the fourth expandable bladder, and the fifth expandable bladder are configured to be inflated from a deflated configuration to an inflated configuration;
the second expandable bladder, the third expandable bladder, and the fourth expandable bladder are configured to be inflated from the deflated configuration to the inflated configuration at a first instance in time; and
at least one of the expandable bladder or the fifth expandable bladder is configured to be inflated from the deflated configuration to the inflated configuration, at a second instance in time that is after the first instance in time, but which at least partially overlaps with the first instance in time.

11. The occupant protection system of claim 5, wherein the front section has a second expandable bladder, the second expandable bladder including:
a first horizontally-extending portion;
a second horizontally-extending portion;
a first vertically-extending portion;
a second vertically-extending portion;
a third vertically-extending portion;
a first diagonally-extending portion extending from a first intersection of the second horizontally-extending portion and the first vertically-extending portion; and
a second diagonally-extending portion extending from a second intersection of the second horizontally-extending portion and the third vertically-extending portion.

12. The occupant protection system of claim 11, wherein:
at least a portion of the first diagonally-extending portion is disposed on the first side section; and
at least a portion of the second diagonally-extending portion is disposed on the second side section.

13. The occupant protection system of claim 5, wherein:
the expandable curtain includes a length that extends at least a portion of a distance between a vehicle roof and a vehicle floor; and
a top of the expandable curtain is configured to couple to a framework disposed in the vehicle roof.

14. The occupant protection system of claim 5, wherein:
the first side section has a first length;
the second side section has a second length; and
the front section has a third length that is longer than the first length and longer than the second length.

15. A vehicle, comprising:
an expandable curtain disposed in a roof of the vehicle, the expandable curtain being configured to selectively deploy from a stowed configuration to a deployed configuration, the expandable curtain including:
a first section,
a second section, and
a third section located between the first section and the second section, the third section having a sleeve defined at least in part by a first slit and a second slit that extend in a direction between the first section and the second section; and
an expandable bladder that is configured to inflate at least partially during deployment of the expandable curtain, the expandable bladder including:
a neck portion at having a first end and a second end, the first end and the second end being disposed external to the sleeve, and wherein part of the neck portion between the first end and the second end is disposed within the sleeve, and
a head portion extending from the neck portion.

16. The vehicle of claim 15, further comprising:
a second expandable bladder that is configured to inflate at least partially during deployment of the expandable curtain, the second expandable bladder including:
a second neck portion mechanically coupled to the expandable curtain, and
a second head portion extending from the second neck portion;
a first inflator fluidly connected to the expandable bladder and configured to inflate the expandable bladder; and
a second inflator fluidly connected to the second expandable bladder and configured to inflate the second expandable bladder.

17. The vehicle of claim 15, wherein:
the first section includes a second expandable bladder;
the second section includes a third expandable bladder; and
the third section includes a fourth expandable bladder.

18. The vehicle of claim 15, wherein the neck portion is at least one of adhered to or formed within the expandable curtain.

19. The vehicle of claim 15, wherein the expandable curtain includes a second expandable bladder that is configured to inflate as the expandable curtain is deployed from the stowed configuration to the deployed configuration, the second expandable bladder including:
a first horizontally-extending portion;
a second horizontally-extending portion;
a first vertically-extending portion;
a second vertically-extending portion;
a third vertically-extending portion;
a first diagonally-extending portion extending from a first intersection of the second horizontally-extending portion and the first vertically-extending portion; and
a second diagonally-extending portion extending from a second intersection of the second horizontally-extending portion and the third vertically-extending portion.

20. The vehicle of claim 19, wherein the neck portion couples to the expandable curtain interior to the first horizontally-extending portion, the second horizontally-extending portion, the first vertically-extending portion, and the second vertically-extending portion.

* * * * *